US012198696B2

(12) United States Patent
Cho et al.

(10) Patent No.: US 12,198,696 B2
(45) Date of Patent: Jan. 14, 2025

(54) ELECTRONIC DEVICE AND OPERATION METHOD THEREOF

(71) Applicant: Samsung Electronics Co., Ltd., Gyeonggi-do (KR)

(72) Inventors: Jungkeun Cho, Gyeonggi-do (KR); Jaeyung Yeo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 239 days.

(21) Appl. No.: 17/946,487

(22) Filed: Sep. 16, 2022

(65) Prior Publication Data

US 2023/0094274 A1 Mar. 30, 2023

Related U.S. Application Data

(63) Continuation of application No. PCT/KR2022/013769, filed on Sep. 15, 2022.

(30) Foreign Application Priority Data

Sep. 28, 2021 (KR) .......................... 10-2021-0128050

(51) Int. Cl.
*G10L 15/22* (2006.01)
*G06F 3/14* (2006.01)
(Continued)

(52) U.S. Cl.
CPC ................ *G10L 15/22* (2013.01); *G06F 3/14* (2013.01); *G06F 3/167* (2013.01); *G10L 15/063* (2013.01);
(Continued)

(58) Field of Classification Search
CPC ....... G10L 15/22; G10L 15/063; G10L 15/16; G10L 2015/223; G06F 3/14; G06F 3/167
(Continued)

(56) References Cited

U.S. PATENT DOCUMENTS 9,070,366 B1 6/2015 Mathias et al.
10,440,167 B2 10/2019 Choi et al.
(Continued)

FOREIGN PATENT DOCUMENTS

KR 10-2018-0096483 A 8/2018
KR 10-2019-0011031 A 2/2019
(Continued)

OTHER PUBLICATIONS

M. Migliardi and M. Gaudina, "Active Personal Information Manager: A System for Human Memory Support, " 2011 International Conference on Complex, Intelligent, and Software Intensive Systems, Seoul, Korea (South), 2011, pp. 583-588, doi: 10.1109/CISIS. 2011.96. keywords: {Context;Servers; Google; Database (Year: 2011).*

(Continued)

*Primary Examiner* — Bharatkumar S Shah
(74) *Attorney, Agent, or Firm* — Cha & Reiter, LLC

(57) ABSTRACT

An electronic device and method are disclosed. The electronic device includes a display, input circuitry, a memory and a processor. The processor implements the method, including: display on the display a hint view including a hint, identifying a type of the hint, generating execution information for the hint based on the identified type, including a goal and a capsule, storing the hint with the generated execution information, receiving a user input and determining whether the input corresponds to the stored hint, when the input corresponds to the stored hint, execute the goal using the capsule, and displaying response data prompting update associated with the hint.

20 Claims, 15 Drawing Sheets

(51) Int. Cl.
*G06F 3/16* (2006.01)
*G10L 15/06* (2013.01)
*G10L 15/16* (2006.01)

(52) U.S. Cl.
CPC ........ *G10L 15/16* (2013.01); *G10L 2015/223* (2013.01)

(58) Field of Classification Search
USPC ........................................................ 704/232
See application file for complete search history.

(56) References Cited

U.S. PATENT DOCUMENTS

| | | | |
|---|---|---|---|
| 10,546,023 | B2 | 1/2020 | Ni |
| 10,547,729 | B2 | 1/2020 | Choi et al. |
| 10,581,824 | B2 | 3/2020 | Ducker et al. |
| 10,976,997 | B2 | 4/2021 | Kim et al. |
| 11,145,019 | B2 * | 10/2021 | De Cremer ........ G06Q 50/2057 |
| 11,146,670 | B2 | 10/2021 | Choi et al. |
| 11,176,936 | B2 | 11/2021 | Mathias et al. |
| 11,232,155 | B2 | 1/2022 | Ni |
| 11,303,623 | B2 | 4/2022 | Ducker et al. |
| 11,494,443 | B2 | 11/2022 | Ahn et al. |
| 11,650,785 | B1 * | 5/2023 | Voss .................... G06F 3/04842 700/94 |
| 2015/0312236 | A1 * | 10/2015 | Ducker ................ G06F 21/44 726/4 |
| 2017/0332064 | A1 * | 11/2017 | Martineau ............ G06T 19/006 |
| 2018/0315425 | A1 | 11/2018 | Mathias et al. |
| 2019/0394511 | A1 | 11/2019 | Kalaboukis et al. |
| 2020/0043476 | A1 | 2/2020 | Hwang |
| 2020/0192684 | A1 * | 6/2020 | Woo ...................... G06F 3/0488 |
| 2021/0020168 | A1 * | 1/2021 | Dame .................. G08G 5/0013 |
| 2021/0280180 | A1 | 9/2021 | Skobeltsyn et al. |
| 2021/0295839 | A1 | 9/2021 | Xu |
| 2022/0157309 | A1 | 5/2022 | Skobeltsyn et al. |
| 2022/0399030 | A1 * | 12/2022 | Zhou .................... G10L 21/055 |

FOREIGN PATENT DOCUMENTS

| | | |
|---|---|---|
| KR | 10-2019-0019442 A | 2/2019 |
| KR | 10-2019-0092997 A | 8/2019 |
| KR | 10-2020-0007882 A | 1/2020 |
| WO | 2019/221894 A1 | 11/2019 |

OTHER PUBLICATIONS

G. Chen and M. Kandemir, "Optimizing embedded applications using programmer-inserted hints," Proceedings of the ASP-DAC 2005. Asia and South Pacific Design Automation Conference, 2005., Shanghai, China, 2005, pp. 157-160 vol. 1, doi: 10.1109/ASPDAC.2005.1466149. keywords: {Optimizing compilers;Applic (Year: 2005).*

G. Chen and M. Kandemir, "Optimizing embedded applications using programmer-inserted hints," Proceedings of the ASP-DAC 2005. Asia and South Pacific Design Automation Conference, 2005., Shanghai, China, 2005, pp. 157-160 vol. 1, doi: 10.1109/ASPDAC.2005. 1466149. keywords: {Optimizing compilers;Appli (Year: 2005).*

M. Migliardi and M. Gaudina, "Active Personal Information Manager: A System for Human Memory Support," 2011 International Conference on Complex, Intelligent, and Software Intensive Systems, Seoul, Korea (South), 2011, pp. 583-588, doi: 10.1109/CISIS.2011.96. keywords: {Context;Servers; Google; Datab (Year: 2011).*

International Search Report dated Jan. 12, 2023.

* cited by examiner

| Hint | Type |
|---|---|
| 913 — "PLAY LATEST MUSIC"<br>923 — - CapsuleID: viv.melon<br>933 — - Goal ID: viv.melon03 ⎬ 911 | Utterance |
| 914 — "GOOD MORNING"<br>915 — (1) WHAT DATE IS IT TODAY<br>925 — - CapsuleId: viv.calendar<br>935 — - Goal ID: viv.calendar01<br><br>916 — (2) TELL ME WEATHER<br>926 — - CapsuleId: viv.weather<br>936 — - Goal ID: viv.weather03<br><br>917 — (3) TELL ME ABOUT STOCK MARKET<br>927 — - CapsuleId: viv.stockMarket<br>937 — - Goal ID. viv.stockMarket02 ⎬ 912 | Quick Command |

FIG.9

Hint DB 1000

| No | Utterance 1011 1001 | sub Utterance 1002 | Order 1013 1003 | Capsule ID 1023 1014 | Goal ID 1004 1024 | Type 1005 1025 |
|---|---|---|---|---|---|---|
| 1 | PLAY LATEST MUSIC | | 1 | viv.melon | viv.melon03 | Utterance |
| 2 | GOOD MORNING 1021 | WHAT DATE IS IT TODAY 1022 | 1 1032 | viv.calendar 1033 | viv.calendar01 1034 | QuickCommand 1035 |
| 3 | GOOD MORNING | TELL ME WEATHER | 2 | viv.weather | viv.weather03 | QuickCommand |
| 4 | GOOD MORNING | TELL ME ABOUT STOCK MARKET 1042 | 3 1043 | viv.stockMarket 1044 | viv.stockMarket02 | QuickCommand 1045 |

FIG.10

ELECTRONIC DEVICE AND OPERATION METHOD THEREOF

CROSS-REFERENCE TO RELATED APPLICATION(S)

This application is a continuation of International Application No. PCT/KR2022/013769, which was filed on Sep. 15, 2022, and claims priority to Korean Patent Application No. 10-2021-0128050, filed on Sep. 28, 2021, in the Korean Intellectual Property Office, the disclosures of which are incorporated by reference herein their entirety.

BACKGROUND

Technical Field

Certain embodiments of the disclosure relate to voice commands in electronic terminals.

Description of Related Art

With continued development of artificial intelligence (AI) technology, AI-assisted user interfaces have become more common, such as voice-based AI assistances. Accordingly, users can now interact with their terminals using AI-assisted input methods, such as by natural conversation, beyond traditional keyboard and mouse inputs. For example, a smart phone, tablet or other such electronic device may receiver an input in the form of a voice input as generated by the user, and then provide a function of service corresponding to the voice input.

In tandem with AI-assisted voice-based inputs, speech recognition services are also being developed, which may enable so-called "natural language understanding" (NLU). NLU refers to computer-based technology that can derive an intent of a user through a voice input, generate a result matching the intent, and provide a service according to the result. In practice, users may naturally vocalize inputs to an AI executing in tandem with their portable terminals, or even have natural conversations with the AI in the course of using such a service.

Accordingly, it is desirable to improve this process, including not only improving speech recognition accuracy, but also recommending commands executable by an assistant device, and inducing the user to directly vocalize the commands.

SUMMARY

Certain issues may arise in the process of recommending a command executable by an assistant device, and inducing the user to vocalize the command. For example, when procedures for recognizing and processing utterances for disparate systems are different from one another, the recommended command may be different from one another. For example, some systems may be implemented in a form of "domain"+"action". On the other hand, other systems may be implemented in another form. When the recommendation command is implemented in an utterance form optimized for a first system, a recognition rate or processing success rate may be increased when the user utters a particular utterance. However, when the recommendation command is implemented in an optimized format for another system, in which a domain name is long or in which it is difficult to pronounce the domain name, constraints may arise for implementing and displaying a recommended command on a screen.

Certain embodiments of the present disclosure provide a method and device that may display a recommended command of a voice assistant on a display, generate and store utterance execution information, which involves operation and additional information thereof when a user utters the corresponding utterance. The device may be operated depending on the utterance execution information and the additional information.

Certain embodiments of the present disclosure provide a method and device that may generate an intended result value even when the same sentence is uttered while deviating from the corresponding screen, after the recommendation command is uttered.

According to certain embodiments of the disclosure, an electronic device may include a display, input circuitry, a memory, and a processor, wherein the processor is configured to: display on the display a hint view, including at least one hint corresponding to a user utterance, identify a type of the at least one hint displayed in the hint view, generate execution information for the at least one hint, based on the identified type, wherein the execution information includes at least a goal indicative of a function to be executed, and a capsule indicative of a domain in which the goal is executed, store the at least one hint with the generated execution information in the memory, receive a user input through the input circuitry, and determine whether the received user input corresponds to the stored at least one hint, when the received user input corresponds the at least one hint, execute the goal using the capsule included in the execution information, and display response data prompting an update on the processing of the user utterance corresponding to the at least one hint.

According to certain embodiments of the disclosure, a method performed by an electronic device may include displaying, on a display included in the electronic device or operatively connected to the electronic device, a hint view, including at least one hint corresponding to a user utterance, identifying, via at least one processor, a type of the at least one hint included in the hint view, generating execution information for the at least one hint based on the identified type, wherein the execution information includes at least a goal indicative of a function to be executed, and a capsule indicative of a domain in which the goal is executed, storing the at least one hint with the execution information of the hint in a memory, receiving a user input through input circuitry and determining whether the receiver user input corresponds to the stored at least one hint, when the received user input corresponds to the at least one hint, executing the goal included using the AI capsule included in the execution information, and displaying response data prompting an update on the processing of the user utterance corresponding to the at least one hint In certain embodiments of the disclosure, a method and device may display a recommended command of a voice assistant on a screen, generate and store utterance execution information which involves operation, and additional information when a user utters the corresponding utterance. The device may be operated depending on the utterance execution information and the additional information.

In certain embodiments of the disclosure, a method and device may generate an intended result value, even when the same sentence is uttered while deviating from a corresponding screen, after the recommendation command is uttered.

Furthermore, a variety of effects directly or indirectly understood through the disclosure may be provided.

BRIEF DESCRIPTION OF THE DRAWINGS

FIG. 9 is an example diagram of a method of generating execution information of a hint depending on a type of a hint included in a hint view displayed by an electronic device, according to certain embodiments of the disclosure.

FIG. 10 is an example diagram of a hint and execution information stored in a hint DB, according to certain embodiments of the disclosure.

With regard to description of drawings, the same or similar components will be marked by the same or similar reference signs.

DETAILED DESCRIPTION

Hereinafter, certain embodiments of the disclosure may be described with reference to accompanying drawings. However, it should be understood that this is not intended to limit the disclosure to specific implementation forms and includes various modifications, equivalents, and/or alternatives of embodiments of the disclosure.

Figure 1:
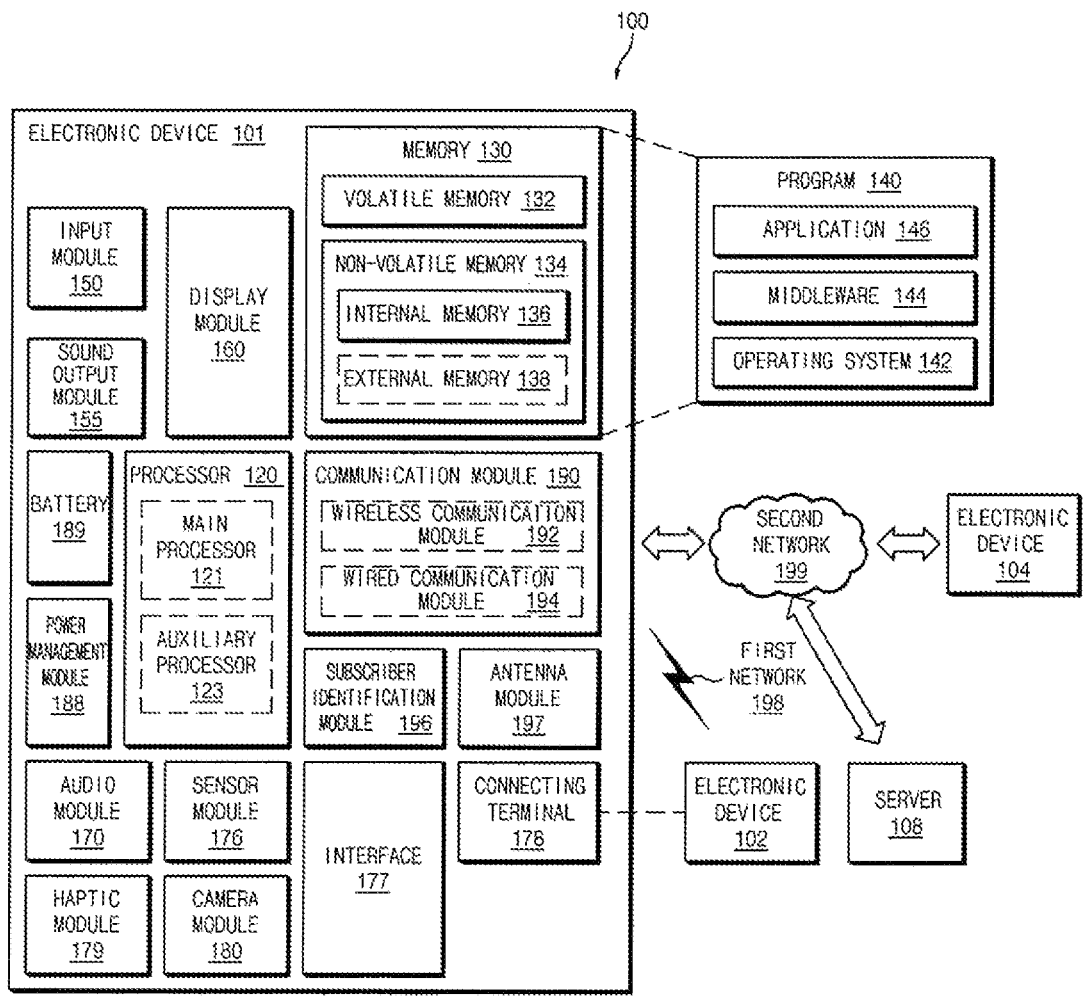
FIG. 1 is a block diagram of an electronic device in a network environment, according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
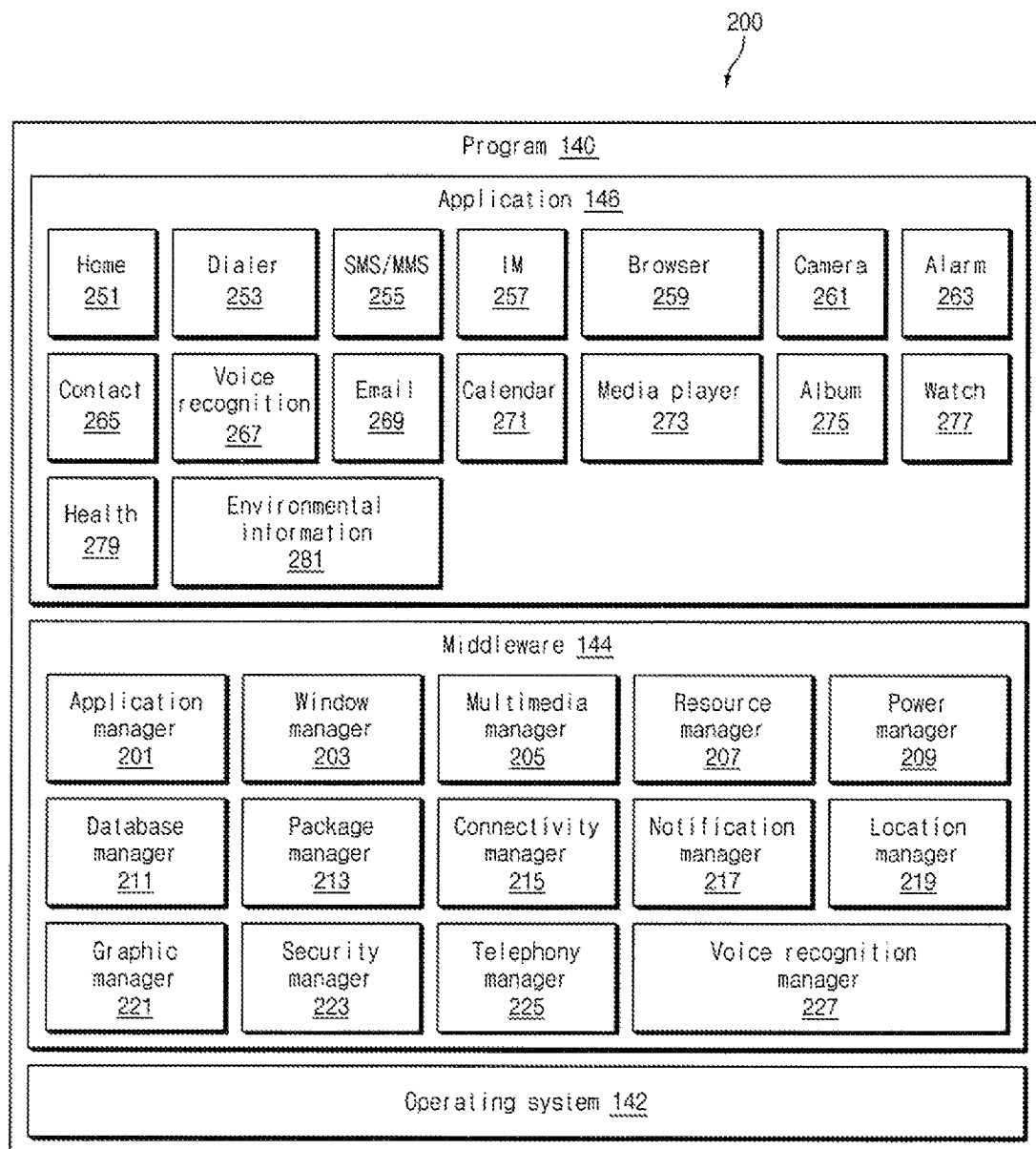
FIG. 2 is a block diagram of a program, according to certain embodiments.

FIG. 2 is a block diagram 200 illustrating the program 140 according to certain embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 144 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
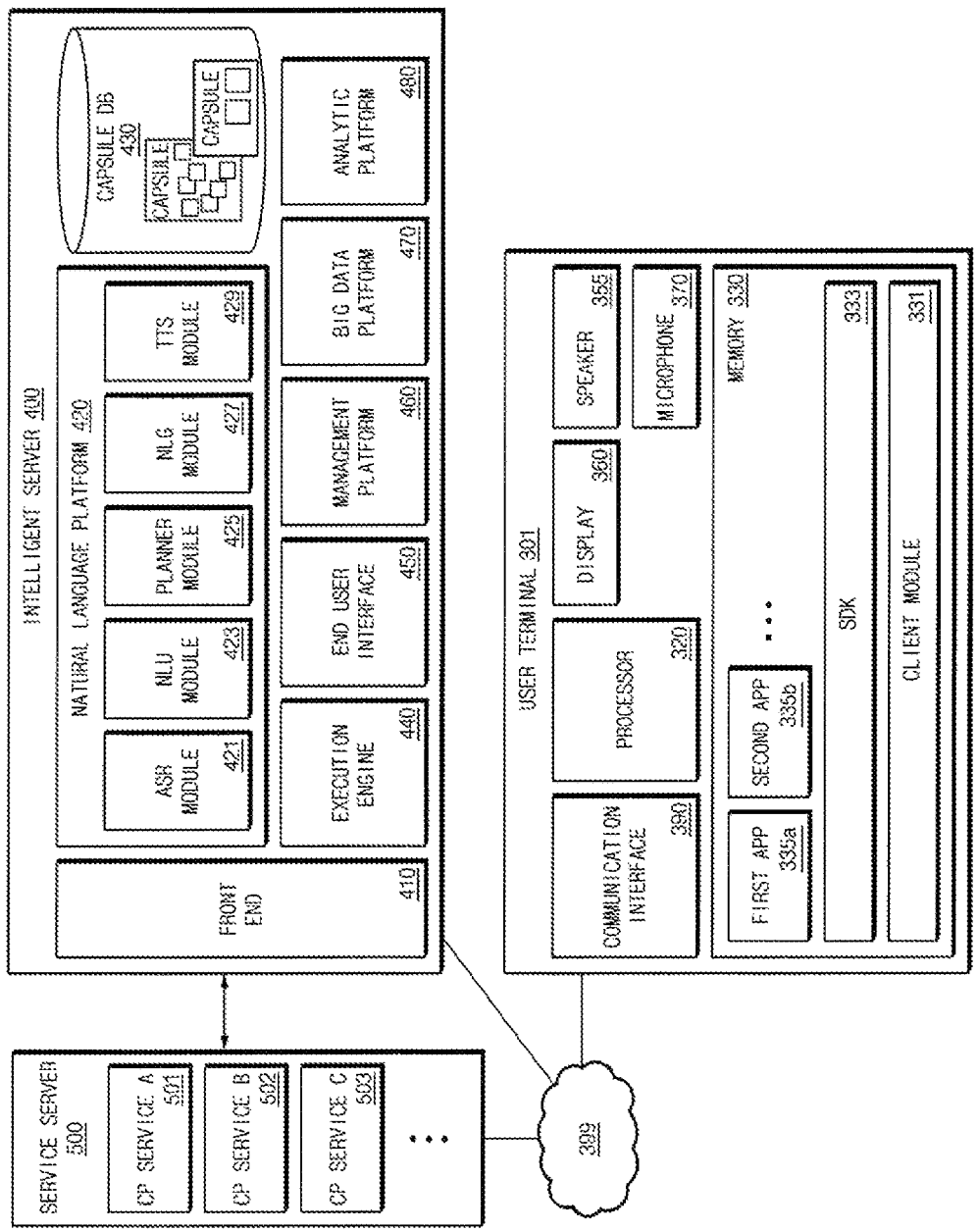
FIG. 3 is a block diagram illustrating an integrated intelligence system, according to an embodiment.

FIG. 3 is a block diagram illustrating an integrated intelligence system, according to an embodiment.

Referring to FIG. 3, an integrated intelligence system according to an embodiment may include a user terminal 301, an intelligence server 400, and a service server 500, which may all be communicatively connected over a network 399.

The user terminal 301 according to an embodiment may be a terminal device (or an electronic device) capable of connecting to Internet, and may be, for example, a mobile phone, a smartphone, a personal digital assistant (PDA), a notebook computer, a television (TV), a household appliance, a wearable device, ahead mounted display (HMD), or a smart speaker.

According to the illustrated embodiment, the user terminal 301 may include a communication interface 390, a microphone 370, a speaker 355, a display 360, a memory 330, or a processor 320. The listed components may be operatively or electrically connected to one another.

The communication interface 390 according to an embodiment may be connected to an external device and may be configured to transmit or receive data to or from the external device. The microphone 370 according to an embodiment may receive a sound (e.g., a user utterance) to convert the sound into an electrical signal. The speaker 355 according to an embodiment may output the electrical signal as sound (e.g., voice). The display 360 according to an embodiment may be configured to display an image or a video. The display 360 according to an embodiment may display the graphic user interface (GUI) of the running app (or an application program).

The memory 330 according to an embodiment may store a client module 331, a software development kit (SDK) 333, and a plurality of apps 335a, 335b. The client module 331 and the SDK 333 may include a framework (or a solution program) for performing general-purposed functions. Furthermore, the client module 331 or the SDK 333 may include the framework for processing a voice input.

The plurality of apps 335a, 335b may be programs for performing a specified function. According to an embodiment, the plurality of apps may include a first app 335a and/or a second app 335b. According to an embodiment, each of the plurality of apps 335a, 335b may include a plurality of actions for performing a specified function. For example, the apps may include an alarm app, a message app, and/or a schedule app. According to an embodiment, the plurality of apps 335a, 335b may be executed by the processor 320 to sequentially execute at least part of the plurality of actions.

According to an embodiment, the processor 320 may control overall operations of the user terminal 301. For example, the processor 320 may be electrically connected to the communication interface 390, the microphone 370, the speaker 355, and the display 360 to perform a specified operation. For example, the processor 320 may include at least one processor.

Moreover, the processor 320 according to an embodiment may execute the program stored in the memory 330 so as to perform a specified function. For example, according to an embodiment, the processor 320 may execute at least one of the client module 331 or the SDK 333 so as to perform a following operation for processing a voice input. The processor 320 may control operations of the plurality of apps 335a, 335b via the SDK 333. The following actions described as the actions of the client module 331 or the SDK 333 may be the actions performed by the execution of the processor 320.

According to an embodiment, the client module 331 may receive a voice input. For example, the client module 331 may receive a voice signal corresponding to a user utterance detected through the microphone 370. The client module 331 may transmit the received voice input (e.g., a voice input) to the intelligence server 400. The client module 331 may transmit state information of the user terminal 301 to the intelligence server 400 together with the received voice input. For example, the state information may be execution state information of an app.

According to an embodiment, the client module 331 may receive a result corresponding to the received voice input. For example, when the intelligence server 400 is capable of calculating the result corresponding to the received voice input, the client module 331 may receive the result corresponding to the received voice input. The client module 331 may display the received result on the display 360.

According to an embodiment, the client module 331 may receive a plan corresponding to the received voice input. The client module 331 may display, on the display 360, a result of executing a plurality of actions of an app depending on the plan. For example, the client module 331 may sequentially display the result of executing the plurality of actions on a display. As another example, the user terminal 301 may display a part of results (e.g., a result of the last action) of executing the plurality of actions, on the display.

According to an embodiment, the client module 331 may receive a request for obtaining information to calculate the result corresponding to a voice input, from the intelligence server 400. According to an embodiment, the client module 331 may transmit the information to the intelligence server 400 in response to the request.

According to an embodiment, the client module 331 may transmit, to the intelligence server 400, information about the result of executing a plurality of actions depending on the plan. The intelligence server 400 may identify that the received voice input is correctly processed, by using the result information.

According to an embodiment, the client module 331 may include a speech recognition module. According to an embodiment, the client module 331 may recognize a voice input for performing a limited function, via the speech recognition module. For example, the client module 331 may launch an intelligence app for processing a specific voice input by performing an organic action, in response to a specified voice input (e.g., wake up!).

According to an embodiment, the intelligence server 400 may receive information associated with a user's voice input from the user terminal 301 over a communication network. According to an embodiment, the intelligence server 400 may convert data associated with the received voice input to text data. According to an embodiment, the intelligence server 400 may generate at least one plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system. According to an embodiment, the plan may be selected from a set of predefined plans or may be generated in real time in response to a user's request. For example, the AI system may select at least one plan of the plurality of predefined plans.

According to an embodiment, the intelligence server 400 may transmit a result according to the generated plan to the user terminal 301 or may transmit the generated plan to the user terminal 301. According to an embodiment, the user terminal 301 may display the result according to the plan on a display. According to an embodiment, the user terminal 301 may display a result of executing the action according to the plan on the display.

The intelligence server 400 according to an embodiment may include a front end 410, a natural language platform 420, a capsule database 430, an execution engine 440, an end user interface 450, a management platform 460, a big data platform 470, or an analytic platform 480.

According to an embodiment, the front end 410 may receive a voice input received from the user terminal 301. The front end 410 may transmit a response corresponding to the voice input to the user terminal 301.

According to an embodiment, the natural language platform 420 may include an automatic speech recognition (ASR) module 421, a natural language understanding (NLU) module 423, a planner module 425, a natural language generator (NLG) module 427, and/or a text to speech module (TTS) module 429.

According to an embodiment, the ASR module 421 may convert the voice input received from the user terminal 301 into text data. According to an embodiment, the NLU module 423 may grasp the intent of the user by using the text data of the voice input. For example, the NLU module 423 may grasp the intent of the user by performing syntactic analysis or semantic analysis. According to an embodiment, the NLU module 423 may grasp the meaning of words extracted from the voice input by using linguistic features (e.g., syntactic elements) such as morphemes or phrases and may determine the intent of the user by matching the grasped meaning of the words to the intent.

According to an embodiment, the planner module 425 may generate the plan by using a parameter and the intent that is determined by the NLU module 423. According to an embodiment, the planner module 425 may determine a plurality of domains utilized to perform a task, based on the determined intent. The planner module 425 may determine a plurality of actions included in each of the plurality of domains determined based on the intent. According to an embodiment, the planner module 425 may determine the parameter utilized to perform the determined plurality of actions or a result value output by the execution of the plurality of actions. The parameter and the result value may be defined as a concept of a specified form (or class). As such, the plan may include the plurality of actions and/or a plurality of concepts, which are determined by the intent of the user. The planner module 425 may determine the relationship between the plurality of actions and the plurality of concepts stepwise (or hierarchically). For example, the planner module 425 may determine the execution sequence of the plurality of actions, which are determined based on the user's intent, based on the plurality of concepts. In other words, the planner module 425 may determine an execution sequence of the plurality of actions, based on the parameters utilized to perform the plurality of actions and the result output by the execution of the plurality of actions. Accordingly, the planner module 425 may generate a plan including information (e.g., ontology) about the relationship between the plurality of actions and the plurality of concepts. The planner module 425 may generate the plan by using information stored in the capsule DB 430 storing a set of relationships between concepts and actions.

According to an embodiment, the NLG module 427 may change specified information into information in a text form. The information changed to the text form may be in the form of a natural language speech. The TTS module 429 according to an embodiment may change information in the text form to information in a voice form.

According to an embodiment, all or part of the functions of the natural language platform 420 may be also implemented in the user terminal 301.

The capsule DB 430 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 430 may store the plurality of capsules in a form of a concept action network (CAN). According to an embodiment, the plurality of capsules may be stored in the function registry included in the capsule DB 430.

The capsule DB 430 may include a strategy registry that stores strategy information utilized to determine a plan corresponding to a voice input. When there are a plurality of plans corresponding to the voice input, the strategy information may include reference information for determining one plan. According to an embodiment, the capsule DB 430 may include a follow-up registry that stores information of the follow-up action for suggesting a follow-up action to the user in a specified context. For example, the follow-up action may include a follow-up utterance. According to an embodiment, the capsule DB 430 may include a layout registry storing layout information of information output via the user terminal 301. According to an embodiment, the capsule DB 430 may include a vocabulary registry storing vocabulary information included in capsule information. According to an embodiment, the capsule DB 430 may include a dialog registry storing information about dialog (or interaction) with the user. The capsule DB 430 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set. The capsule DB 430 according to an embodiment may be also implemented in the user terminal 301.

According to an embodiment, the execution engine 440 may calculate a result by using the generated plan. The end user interface 450 may transmit the calculated result to the user terminal 301. Accordingly, the user terminal 301 may receive the result and may provide the user with the received result. According to an embodiment, the management platform 460 may manage information used by the intelligence server 400. According to an embodiment, the big data platform 470 may collect data of the user. According to an embodiment, the analytic platform 480 may manage quality of service (QoS) of the intelligence server 400. For example, the analytic platform 480 may manage the component and processing speed (or efficiency) of the intelligence server 400.

According to an embodiment, the service server 500 may provide the user terminal 301 with a specified service (e.g., ordering food or booking a hotel). A plurality of services may be provided for one or more users, as seen with CP services A 501, B 502 and C 503, respectively. According to an embodiment, the service server 500 may be a server operated by the third party. According to an embodiment, the service server 500 may provide the intelligence server 400 with information for generating a plan corresponding to the received voice input. The provided information may be stored in the capsule DB 430. Furthermore, the service server 500 may provide the intelligence server 400 with result information according to the plan.

In the above-described integrated intelligence system, the user terminal 301 may provide the user with various intelligent services in response to a user input. The user input may include, for example, an input through a physical button, a touch input, or a voice input.

According to an embodiment, the user terminal 301 may provide a speech recognition service via an intelligence app (or a speech recognition app) stored therein. In this case, for example, the user terminal 301 may recognize a user utterance or a voice input, which is received via the microphone, and may provide the user with a service corresponding to the recognized voice input.

According to an embodiment, the user terminal 301 may perform a specified action, based on the received voice input, independently, or together with the intelligence server and/or the service server. For example, the user terminal 301 may launch an app corresponding to the received voice input and may perform the specified action via the executed app.

In an embodiment, when providing a service together with the intelligence server 400 and/or the service server, the user terminal 301 may detect a user utterance by using the microphone 370 and may generate a signal (or voice data) corresponding to the detected user utterance. The user terminal may transmit the voice data to the intelligence server 400 by using the communication interface 390.

According to an embodiment, the intelligence server 400 may generate a plan for performing a task corresponding to the voice input or the result of performing an action depending on the plan, as a response to the voice input received from the user terminal 301. For example, the plan may include a plurality of actions for performing the task corresponding to the voice input of the user and/or a plurality of concepts associated with the plurality of actions. The concept may define a parameter to be entered upon executing the plurality of actions or a result value output by the execution of the plurality of actions. The plan may include relationship information between the plurality of actions and the plurality of concepts.

According to an embodiment, the user terminal 301 may receive the response by using the communication interface 390. The user terminal 301 may output the voice signal generated in the user terminal 301 to the outside by using the speaker 355 or may output an image generated in the user terminal 301 to the outside by using the display 360.

Figure 4:
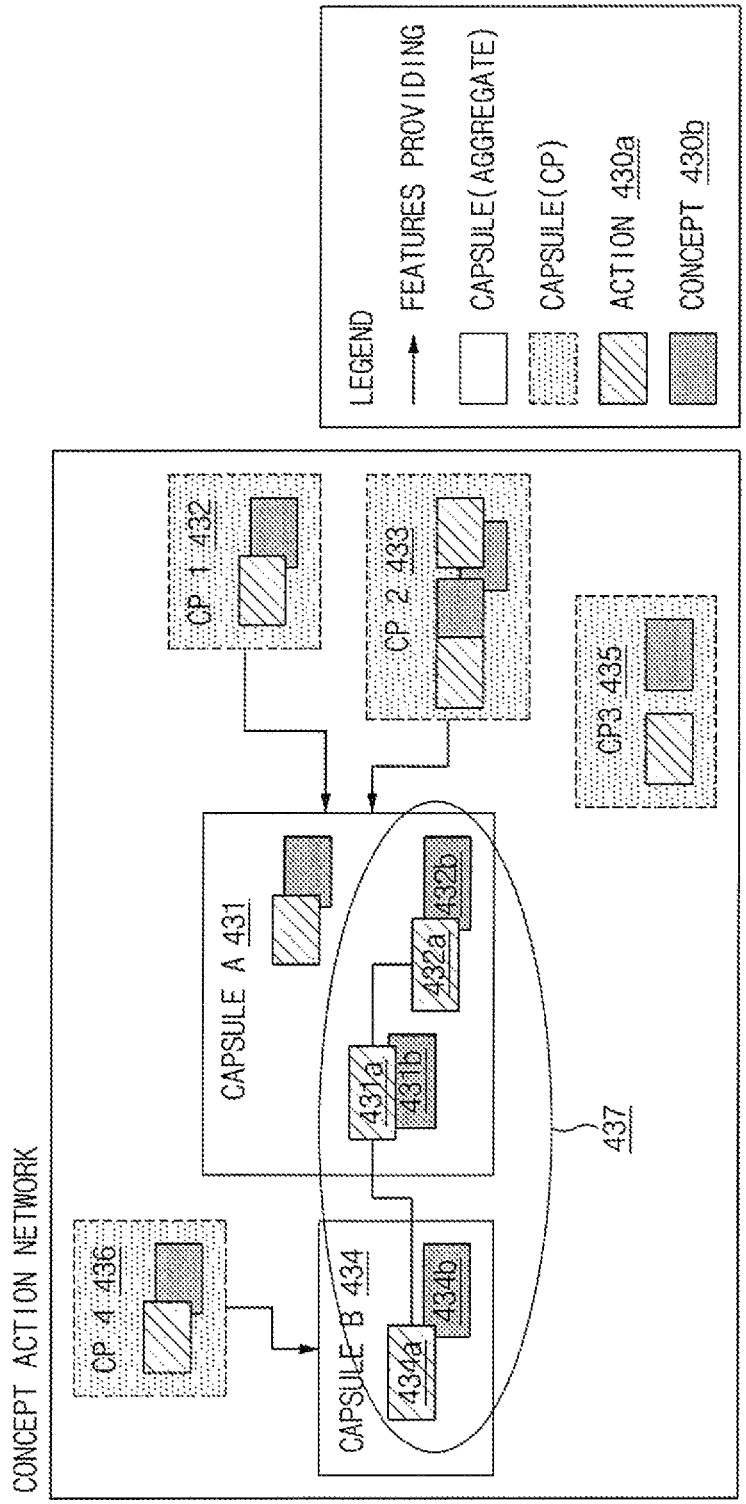
FIG. 4 is a diagram illustrating the form in which relationship information between a concept and an action is stored in a database, according to an embodiment.

FIG. 4 is a diagram illustrating a form in which relationship information between a concept and an action is stored in a database, according to certain embodiments.

A capsule database (e.g., the capsule DB 430) of the intelligence server 400 may store a capsule in the form of a CAN. The capsule DB may store an action for processing a task corresponding to a user's voice input and a parameter utilized for the action, in the CAN form.

The capsule DB may store a plurality capsules (a capsule A 431 and a capsule B 434) respectively corresponding to a plurality of domains (e.g., applications). According to an embodiment, a single capsule (e.g., the capsule A 431) may correspond to a single domain (e.g., a location (geo) or an application). Furthermore, at least one service provider (e.g., CP 1 432 or CP 2 433) for performing a function for a domain associated with the capsule may correspond to one capsule. According to an embodiment, the one capsule may include at least one or more actions 430a and at least one or more concepts 430b for performing a specified function. Other service providers may be present in the network, such as CP 3 435 and CP 4 436.

The natural language platform 420 may generate a plan for performing a task corresponding to the received voice input by using the capsule stored in a capsule database. For example, the planner module 425 of the natural language platform may generate the plan by using the capsule stored in the capsule database. For example, a plan 437 may be generated by using actions 431a and 432a and concepts 431b and 432b of the capsule A 431 and an action 434a and a concept 434b of the capsule B 434.

Figure 5:
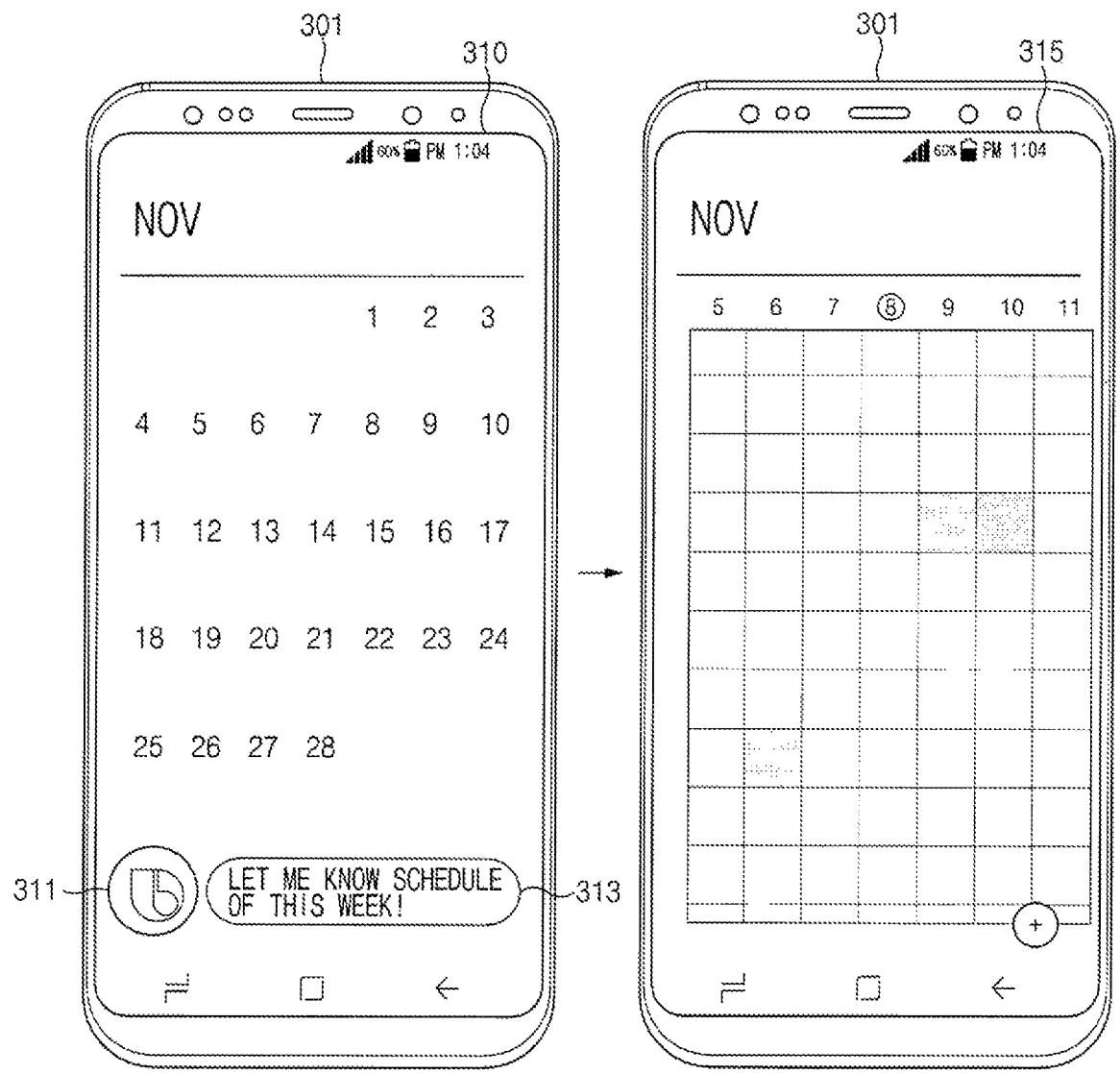
FIG. 5 is a view illustrating a user terminal displaying a screen of processing a voice input received through an intelligence app, according to an embodiment.

FIG. 5 is a view illustrating a screen in which a user terminal processes a voice input received through an intelligence app, according to certain embodiments.

The user terminal 301 may execute an intelligence app to process a user input through the intelligence server 400.

According to an embodiment, on screen 310, when recognizing a specified voice input (e.g., wake up!) or receiving an input via a hardware key (e.g., a dedicated hardware key), the user terminal 301 may launch an intelligence app for processing a voice input. For example, the user terminal 301 may launch the intelligence app in a state where a schedule app is executed. According to an embodiment, the user terminal 301 may display an object (e.g., an icon) 311 corresponding to the intelligence app, on the display 360. According to an embodiment, the user terminal 301 may receive a voice input by a user utterance. For example, the user terminal 301 may receive a voice input saying that "let me know the schedule of this week!". According to an embodiment, the user terminal 301 may display a user interface (UI) 313 (e.g., an input window) of the intelligence app, in which text data of the received voice input is displayed, on a display.

According to an embodiment, on screen 315, the user terminal 301 may display a result corresponding to the received voice input, on the display. For example, the user terminal 301 may receive a plan corresponding to the received user input and may display "the schedule of this week" on the display depending on the plan.

In an embodiment, the user terminal 301 of FIGS. 3, 4, and 5 may correspond to the electronic device 101 of FIG. 1. In an embodiment, the intelligence server 400 of FIG. 3 may correspond to one of the electronic device 104 and the server 108 of FIG. 1. In an embodiment, the processor 320 of FIG. 3 may correspond to the processor 120 of FIG. 1; the display 360 of FIG. 3 may correspond to the display module 160 of FIG. 1; and, the speaker 355 of FIG. 3 may correspond to the sound output module 155 of FIG. 1.

Figure 6:
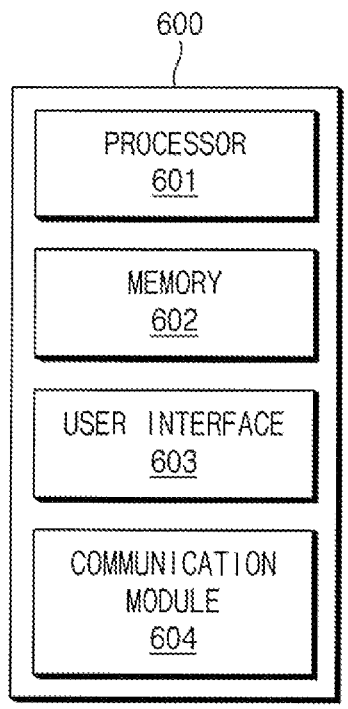
FIG. 6 is a block diagram illustrating a structure of an electronic device, according to certain embodiments of the disclosure.

FIG. 6 is a block diagram illustrating a structure of an electronic device 600, according to certain embodiments of the disclosure. For clarity of description, descriptions the same as the above-mentioned descriptions may be briefly described or omitted.

Referring to FIG. 6, the electronic device 600 may include a processor 601 (e.g., the processor 320 of FIG. 3 and/or the processor 120 of FIG. 1), a memory 602 (e.g., the memory 130 of FIG. 1), a user interface 603, and/or a communication module 604 (e.g., the communication module 190 of FIG. 1). The user interface 603 may include a microphone (not shown) (e.g., the microphone 370 of FIG. 3 and/or the input module 150 of FIG. 1, which may also be referred to as "input circuitry"), a display (not shown) (e.g., the display 360 of FIG. 3 and/or the display module 160 of FIG. 1), and/or a speaker (not shown) (e.g., the speaker 355 of FIG. 3 and/or the sound output module 155 of FIG. 1).

The electronic device 600 may further include at least one of additional components in addition to the components illustrated in FIG. 6. According to an embodiment, the components of the electronic device 600 may be the same entities or may include separate entities.

For example, the electronic device 600 may include a smartphone, a tablet PC, a wearable device, a home appliance, or a digital camera. According to an embodiment, the processor 601 may be operatively coupled to the communication module 604, the memory 602, and the user interface 603 (e.g., a microphone (not illustrated), a display (not shown), and a speaker (not illustrated)) to perform functions of the electronic device 600. For example, the processor 601 may include one or more processors. For example, the one or more processors may include an image signal processor (ISP), an application processor (AP), or a communication processor (CP).

Figure 7:
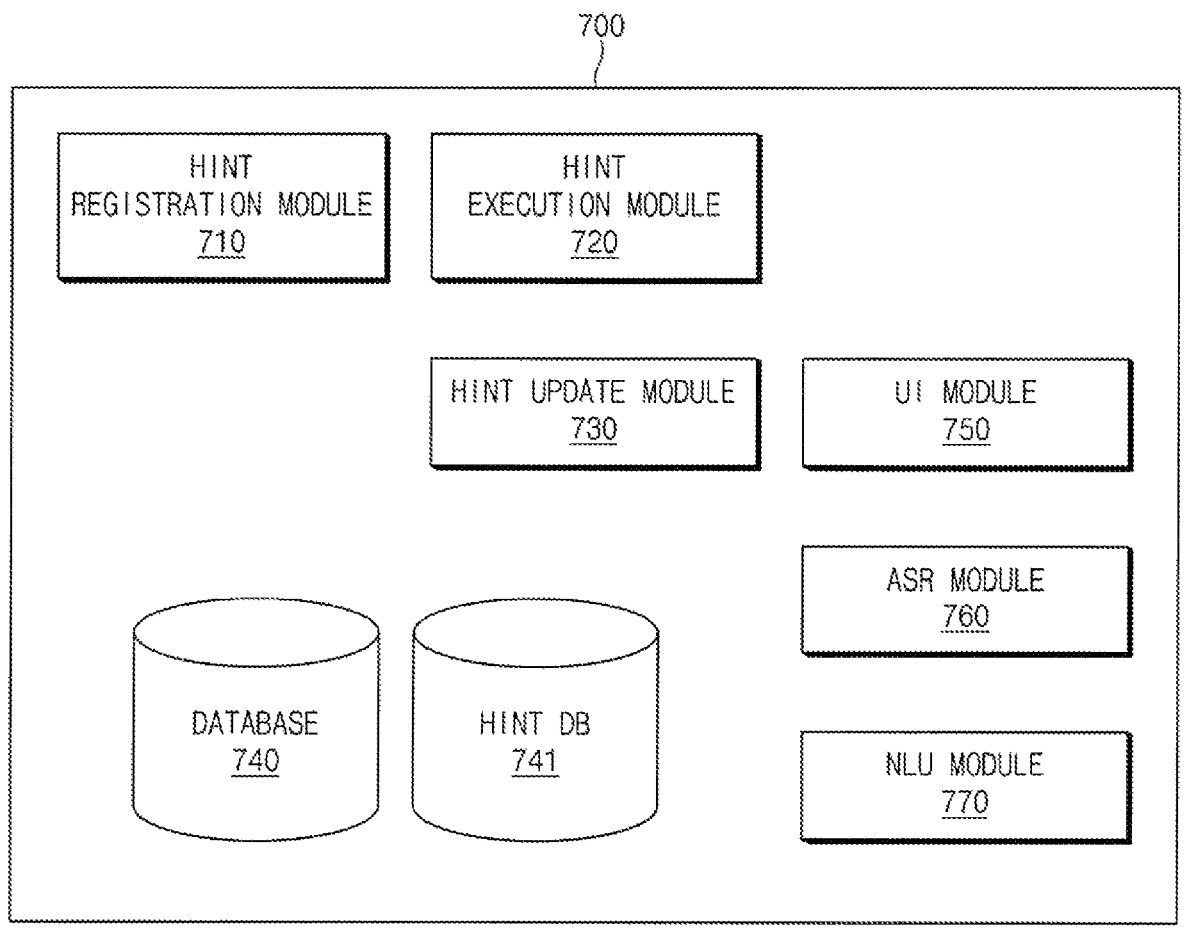
FIG. 7 is another block diagram illustrating a structure of an electronic device, according to certain embodiments of the disclosure.

Furthermore, the processor 601 may drive a module (e.g., a hint registration module 710, a hint execution module 720, a hint update module 730, a UI module 750, an ASR module 760, and/or an NLU module 770 in FIG. 7) by executing instructions stored in the memory 602.

The processor 601 may be operatively connected to the module (e.g., the hint registration module 710, the hint execution module 720, the hint update module 730, the UI module 750, the ASR module 760, and/or the NLU module 770 in FIG. 7) to perform overall functions of the electronic device 600. In certain embodiments of the disclosure, it may be understood that an operation performed (or executed) by the modules (e.g., the hint registration module 710, the hint execution module 720, the hint update module 730, the UI module 750, the ASR module 760, and/or the NLU module 770 in FIG. 7) is an operation performed by the processor 601 executing instructions stored in the memory 602.

In an embodiment, the processor 601 may include the module (e.g., the hint registration module 710, the hint execution module 720, the hint update module 730, the UI module 750, the ASR module 760, and/or the NLU module 770 in FIG. 7). In this case, an operation performed (or executed) by each module (e.g., the hint registration module 710, the hint execution module 720, the hint update module 730, the UI module 750, the ASR module 760, and/or the NLU module 770 in FIG. 7) may be implemented as at least part of the processor 601.

Several modules described in certain embodiments of the disclosure may be implemented by hardware, software, or a combination of hardware and software.

The memory 602 may store a database (not illustrated) (e.g., a database 740 of FIG. 7) including at least one input data. The memory 602 may store commands, information, or data associated with operations of components included in the electronic device 600. For example, the memory 602 may store instructions, when executed, that cause the processor 601 to perform various operations described in the disclosure.

In an embodiment, the electronic device 600 may receive a user input by using the user interface 603. The user input may be an input including a user voice signal (e.g., a user's utterance input).

In an embodiment, the user input may be the user's voice input (e.g., an utterance). When the user input is a voice input, the electronic device 600 may receive a user input through a microphone (or a voice receiving device) (not illustrated).

In an embodiment, the user input may be a gesture input and/or a touch input. When the user input is a gesture input and/or a touch input, the electronic device 600 may receive a user input through a sensor (not illustrated).

According to an embodiment, the processor 601 may include a sound module (not illustrated). The sound module may recognize a user input for executing an operation. For example, the sound module may recognize and receive the voice signal. For example, the sound module recognizing the user input may have a high speech recognition rate because ambient noise is strong.

According to an embodiment, the sound module may be trained to recognize and receive the user input by using an algorithm for recognizing a voice. For example, the algorithm for recognizing the voice may be at least one of a hidden Markov model (HMM) algorithm, an artificial neural network (ANN) algorithm, and a dynamic time warping (DTW) algorithm.

According to an embodiment, the sound module may perform tasks of data refinement, data integration, data reduction, and/or data conversion. The data refinement may include an operation of filling in incomplete data and correcting inconsistent data. The data integration may include an operation of merging various divided databases and files for easy analysis. The data reduction may include an operation of sampling some of input data or reducing the dimension of data to be analyzed. The data conversion may include an operation of normalizing or grouping data by obtaining an average value of the data. The sound module may process data, thereby preventing meaningless values from being included in data or preventing data quality from being degraded due to unintended variables. Accuracy and timeliness may be increased through the sound module.

In an embodiment, at least one of operations of each component described with reference to the electronic device 600 may be performed (or executed) by an external server (not illustrated) or another electronic device (not illustrated). For example, the processor 601 may transmit a user input to the external server (not illustrated) or the other electronic device (not illustrated) by using the communication module 604.

A processor (not illustrated) included in an external server (not illustrated) or the other electronic device (not illustrated) may receive the user input, may generate response data, and may transmit the response data to the electronic device 600.

The processor 601 may receive the response data corresponding to the user input from the external server (not illustrated) or the other electronic device (not illustrated) through the communication module 604. When receiving the response data, the processor 601 may allow the response data to be output through the user interface 603. Alternatively, through the communication module 604, other devices may be controlled or data may be stored. The processor 601 may be implemented using at least one or more processors, and may be driven while being physically divided into a main processor performing high-performance processing and an auxiliary processor performing low-power processing. Alternatively, one processor may process data by switching between a high performance mode and a low power mode depending on situations.

Hereinafter, an operation of the processor 601 will be described in detail.

In an embodiment, the memory may store instructions that cause the processor 601 to identify a type of at least one hint included in a hint view displayed by using the user interface 603, to generate execution information of the hint based on the type of the hint, to store the hint and the execution information of the hint, to determine whether a user input received by using the user interface matches the hint, to execute a goal included in the execution information by using a capsule included in the execution information, when the user input matches the hint, and to display response data for inducing an update of an operation for the hint based on the execution information, by using the user interface.

In an embodiment, the processor 601 may receive a voice signal included in a user input by using the sound model, as implemented in a sound module operatively connected to the processor, and may cause the sound model to be trained by using a learning algorithm.

In an embodiment, the processor 601 may identify the type of the hint based on whether the at least one hint included in the hint view includes one utterance command.

In an embodiment, the processor 601 may identify the hint as a hint of an utterance command type when the at least one hint included in the hint view includes one utterance command, and may generate the execution information including at least one of a capsule ID and a goal ID of the utterance command in the execution information when the hint is the hint of the utterance command type.

In an embodiment, the processor 601 may identify the hint as a hint of a quick command type when the at least one hint included in the hint view includes a plurality of utterance commands, and may generate the execution information including at least one of a capsule ID and a goal ID for a keyword command for executing the quick command and each of the plurality of utterance commands in the execution information when the hint is the hint of the quick command type.

In an embodiment, the processor 601 may store the at least one hint included in the hint view in response to receiving a request (attach) such that the hint view is displayed on a screen viewed to a user, and may delete the at least one hint included in the hint view in response to receiving a request (detach) such that the hint view disappears from a screen viewed to a user.

In an embodiment, the processor 601 may store the at least one hint included in the hint view in response to an event that the hint view is focused, and may delete the at least one hint included in the hint view in response to an event that the hint view is not focused.

In an embodiment, the processor 601 may convert the user input into ASR text data by using an ASR module included in the electronic device or operatively connected to the electronic device, and may determine whether the user input matches the hint, based on the converted ASR text data.

In an embodiment, the processor 601 may change information about at least one of a capsule ID and a goal ID of the hint by using the execution information when the user input is matched with the hint.

In an embodiment, the response data may be data including an icon, which is capable of including a default capsule executing an operation corresponding to a second user input as the capsule included in the execution information, when the second user input, which is identical to the utterance command included in the hint or capable of being recognized to be identical to the utterance command included in the hint, is received.

FIG. 7 is another block diagram illustrating a structure of an electronic device 700, according to an embodiment disclosed in this disclosure. For clarity of description, descriptions the same as the above-mentioned descriptions may be briefly described or omitted.

According to an embodiment that is illustrated, the electronic device 700 may include the hint registration module 710, the hint execution module 720, the hint update module 730, a database 740, a hint DB 741, the UI module 750, the ASR module 760, and/or the NLU module 770. The listed components may be operatively or electrically coupled to one another.

The hint registration module 710, the hint execution module 720, the hint update module 730, the UI module 750, and the ASR module 760 are illustrated as being separate components in FIG. 7. However, the embodiments of the disclosure are not limited thereto.

The hint registration module 710 may retrieve a hint to be displayed through at least part of a "hint view" screen, at a point in time when the hint view is created. The hint view may indicate a screen for displaying at least one hint. In an embodiment, the electronic device 700 may generate different hint views according to application. The hint may include a recommended voice command, which is displayed to a user, such that the electronic device 700 is capable of adding the recommended voice command to a quick command and executing the quick command. The voice command may indicate a text command corresponding to an input voice input by a user through an utterance.

The hint registration module 710 may generate execution information for the hint, such that at least one hint included in the hint view is capable of being executed in a manner suitable for fulfilling the intent of an operation of the hint, and may store the execution information in the hint DB 741.

The hint registration module 710 may generate the execution information for the hint, based on the identified type of the hint.

In an embodiment, the hint registration module 710 may generate the execution information based on whether the type of the hint is an utterance command type (e.g., "utterancetype") or a quick command type (e.g., "quickcommandtype"). The utterance command type (utterancetype) may indicate a hint including a single utterance command. The quick command type (quickcommandtype) may indicate that the hint includes at least one utterance command, and a hint of a quick command type corresponding to the at least one utterance command. For example, the hint of the quick command type may be a hint including one utterance command corresponding to the quick command. The hint of the quick command type may include a plurality of utterance commands corresponding to the quick command.

In an embodiment, when the hint is of an utterance command type (utterancetype), the hint registration module 710 may generate the execution information including capsule ID information and goal ID information. In an embodiment, the capsule ID information may be domain ID information (or application information) utilized when an utterance is to be executed. The goal ID information may be action ID information utilized when an utterance is to be processed.

In an embodiment, when the hint is of a quick command type (quickcommandtype), the hint registration module 710 may generate the execution information including keyword command information and utterance command set information including a quick command. The keyword command information may mean information about a command for executing the quick command. The utterance command set may mean a set implemented using at least one utterance command. The at least one utterance command may include capsule ID information and goal ID information.

At least one utterance command included in the utterance command set may include a capsule ID and a goal ID.

The hint registration module 710 may store and/or delete the hint in the hint DB 741.

In an embodiment, the hint registration module 710 may store at least one hint included in the hint view in the hint DB 741 in response to receiving a request (e.g., an attachment request) such that the hint view is maintained in display on a screen visible to a user.

In an embodiment, the hint registration module 710 may delete all hints included in the hint view from the hint DB 741 in response to receiving a request (e.g., a detachment request) such that the hint view is removed from the screen visible to the user.

In an embodiment, the hint registration module 710 may store at least one hint included in the hint view in the hint DB 741 in response to the event that the hint view is focused. For example, the hint view may be focused to be set to the highest priority with respect to a user input among the displayed elements on the display. For example, the hint view may be unfocused such that the setting is released.

In an embodiment, the hint registration module 710 may delete at least one hint included in the hint view from the hint DB 741 in response to the event that the hint view is not focused.

In an embodiment, the hint registration module 710 may store all hints included in the hint view in the hint DB 741, in response to an event in which the hint view is displayed on a display included in the electronic device 700 or operatively connected to the electronic device 700. For example, the hint registration module 710 may receive a request (e.g., an attachment request) such that the hint view is displayed on the screen visible to the user, and then may store all hints included in the hint view in the hint DB 741 according to a user input (e.g., a scrolling input) in response to the detecting the operational event in which the hint view is displayed on the user's display.

In an embodiment, the hint registration module 710 may delete all hints included in the hint view from the hint DB 741 in response to detecting an event causing the hint view to be removed from the display.

In an embodiment, the hint registration module 710 may call a content provider module (not shown) and then may request the content provider module (not shown) to register and/or delete the hint and the execution information in the hint DB 741.

In an embodiment, the hint execution module 720 may determine whether the received user input (e.g., a user utterance, an ASR text, or a touch input) is an utterance indicated as a hint. The hint execution module 720 may determine whether the received user input (e.g., a user utterance, ASR text) is the utterance indicated as the hint, using the hint generated from the hint registration module 710.

In an embodiment, the hint execution module 720 may receive the hint by making a request for the hint generated from the hint registration module 710 to the content provider module (not shown), and determine whether a hint is present that matches the received user input (e.g., a user utterance or an ASR text). When the hint matching the received user input (e.g., a user utterance or an ASR text) is present, the hint execution module 720 may operate according to the type of the matched hint.

In an embodiment, when the hint is of a quick command type (quickcommandtype), the hint execution module 720 may sequentially deliver a utterance command including the utterance command set included in the hint to a command execution module (not shown).

In an embodiment, when the hint is of an utterance command type (utterancetype), the hint execution module 720 may convert the hint into a user utterance by using information, which is stored in the hint DB 741 together with the hint. The hint execution module 720 may deliver the converted user utterance to the command execution module (not shown).

In an embodiment, the hint execution module 720 may receive, from the ASR module 760, ASR text data obtained by converting the user's voice input into a text. The hint execution module 720 may determine whether the ASR text data includes an utterance sufficiently similar (e.g., satisfying a preset similarity threshold) to the utterance command stored in the hint DB 741. When the ASR text data includes an utterance sufficiently similar to the utterance command stored in the hint DB 741, the hint execution module 720 may add and/or change the ASR text data by using the execution information stored in the hint DB 741.

In an embodiment, the hint execution module 720 may determine whether the utterance included in the ASR text data matches the utterance command stored in the hint DB 741, by comparing the utterance included in the ASR text data with the utterance command. When the compared data sufficiently matches with one another, the hint execution module 720 may add and/or change data as shown in Table 1, such that the corresponding utterance (e.g., "play the latest music") may be executed with the specified domain (capsule) (e.g., melon) and a specified goal ID (Goal ID) (e.g., melon03), utilizing the utterance command data stored in the hint DB 741 that matches the final ASR text.

TABLE 1

| Default Format submitNIRequest (Utterance, CapsuleId, GoalId) | |
|---|---|
| Before Change | After Change |
| submitNIRequest ("play the latest music", null, null) | submitNIRequest ("play the latest music", "viv.melon", "viv.melon03") |

Hereinafter, this will be described in detail with reference to FIG. 12.

In an embodiment, when the hint is displayed on a screen other than the hint view, the hint update module 730 may register operations to be executed based on the type of the hint even when the same user input as the hint is received.

In an embodiment, the hint update module 730 may generate information based on whether the type of the hint is an utterance command type (utterancetype) or a quick command type (quickcommandtype).

In an embodiment, when the hint has a quick command type (quickcommandtype), the hint update module 730 may provide (e.g., display) the user with response data for asking whether to store the hint in a quick command DB (not shown) and may store the hint in the quick command DB (not shown) based on a user input to the response data. In an embodiment, the database 740 may include the quick command DB (not shown).

In an embodiment, when the hint has an utterance command type (utterancetype), the hint update module 730 may provide (e.g., display) the user with response data for inducing whether to set a domain to a default capsule such that the same capsule is capable of processing an utterance input even though the utterance input does not include information about the domain, and may store the hint in the database 740 based on user input to the response data.

In an embodiment, when an utterance identical or similar to the hint displayed through the hint view is received and operated, the UI module 750 may allow the same operation to be performed by applying an additional UI element even though the user utters the same utterance on another screen.

In an embodiment, the UI module 750 may display response data for inducing the user to set a capsule, which executes the operation, as the desired capsule that processes an utterance identical or similar to the hint.

In an embodiment, when the hint has a hint of a quick command type, the UI module 750 may display response data for inducing the user to add a hint of the quick command type to a quick command.

In an embodiment, the UI module 750 may provide (e.g., display) the response data by using a user interface (e.g., the user interface 603 in FIG. 6) included in the electronic device 700 or operatively connected to the electronic device 700.

In an embodiment, the ASR module 760 may convert the received user input into text data. For example, the ASR module 760 may convert received voice data into text data. It is illustrated that the ASR module 760 is included in the electronic device 700 in FIG. 7. However, the ASR module 760 may be included in an external device (e.g., a server) operatively connected to the electronic device 700.

In an embodiment, the NLU module 770 may grasp the user's intent by performing syntactic analysis or semantic analysis. According to an embodiment, the NLU module 770 may grasp the meaning of words extracted from the voice input by using linguistic features (e.g., syntactic elements) such as morphemes or phrases and may determine the intent of the user by matching the grasped meaning of the words to the intent. It is illustrated that the NLU module 770 is included in the electronic device 700 in FIG. 7. However, the NLU module 770 may be included in an external device (e.g., a server) operatively connected to the electronic device 700.

Figure 8:
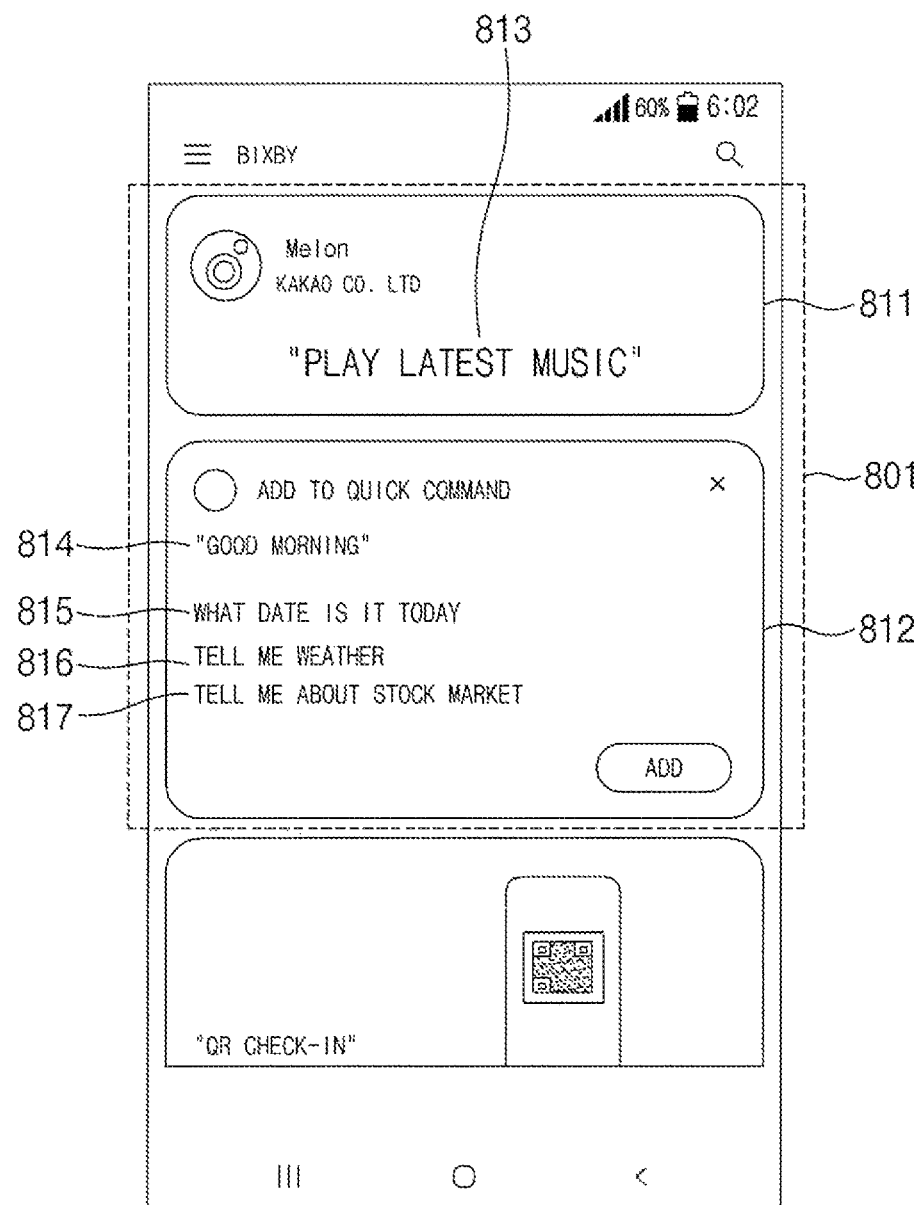
FIG. 8 is an example diagram of a hint view displayed by an electronic device, according to certain embodiments of the disclosure.

FIG. 8 is an example diagram of a hint view displayed by an electronic device, according to certain embodiments of the disclosure.

Referring to FIG. 8, an electronic device (e.g., the user terminal 301 of FIG. 3, the electronic device 600 of FIG. 6, or the electronic device 700 of FIG. 7) may display a hint view 801 by using a display operatively connected to the electronic device or included in the electronic device.

In an embodiment, the electronic device 700 may identify respective types for the displayed hints 811 and 812. As shown in FIG. 8, the first hint 811 includes one utterance command, "play the latest music" 813, and thus it may be determined to correspond to an "utterance" command type (utterancetype). For example, a number of predefined "types" of utterance commands may be stored in memory, and actual utterance commands may be pre-associated with each of the predefined types. Furthermore, the manner in which an utterance command is utilized may aid in determination of a corresponding predetermined type. For example, the inclusion of a particular utterance in a quick command (e.g., a macro of multiple commands) may mark is as belonging to the "quick command" type, at least for that particular usage of the command. The second hint 812 includes a plurality of utterance commands, including "what date is it today?" 815, "tell me the weather" 816, and "tell me about the stock market" 817, together with the quick command of "good morning" 814. Accordingly, the electronic device 700 may identify respective types of these hint to be the "quick command" type (quickcommandtype). Hereinafter, the operations thereof will be described in more detail using FIG. 9.

FIG. 9 is an example diagram of a method of generating execution information for one or more hints, depending on a respective type for each hint included in the hint view displayed by an electronic device, according to certain embodiments of the disclosure. Referring to FIG. 9, an electronic device (e.g., the user terminal 301 of FIG. 3, the electronic device 600 of FIG. 6, or the electronic device 700 of FIG. 7) may classify a type of each hint included in the hint view (e.g., the hint view 801 of FIG. 8), and may generate execution information according to the type of the hint.

Referring to FIG. 9, a first hint 911 may be of the "utterance" command type (utterancetype), and thus, the electronic device 700 may generate capsule ID information 923 and goal ID information 933 for a utterance command of "play latest music" 913, as included in the first hint 911 as execution information.

In an embodiment, the second hint 912 may be of the "quick command" type (quickcommandtype), and thus, the electronic device 700 may generate, as execution information, capsule ID information 925 and goal ID information 935 for an utterance command of "what date is it today?" 915 as included in the quick command of "good morning" 914, capsule ID information 926 and goal ID information 936 of the utterance command of "tell me the weather" 916 included in the quick command of "good morning" 914, and capsule ID information 927 and goal ID information 937 of the utterance command of "tell me about the stock market" 917 included in the quick command of "good morning" 914.

In an embodiment, the electronic device 700 may store and/or delete a hint and the generated execution information in a hint DB (e.g., the hint DB 741 of FIG. 7). This will be described in detail with reference to FIG. 10.

FIG. 10 is an example diagram of a hint and execution information stored in a hint DB, according to an embodiment disclosed in this disclosure. Referring to FIG. 10, an electronic device (e.g., the user terminal 301 of FIG. 3, the electronic device 600 of FIG. 6, or the electronic device 700 of FIG. 7) may classify the type of a hint included in the hint view (e.g., the hint view 801 of FIG. 8) displayed by using a display operatively connected to the electronic device or included in the electronic device and may store execution information generated depending on the type of the hint, in a hint DB 1000.

Referring to FIG. 10, the electronic device may store an utterance 1001 provided as hint, a sub-utterance 1002 indicative of an utterance command included in a hint of a quick command type, a capsule ID 1003, a goal ID 1004, and a hint type 1005, as hint execution information in the hint DB 1000.

Referring to FIG. 10, because a first hint 1011 is of the utterance command type (e.g., utterancetype), the electronic device 700 may store "play the latest music" 1011, which may be an utterance provided as a first hint, capsule ID information 1013, goal ID information 1014, and a hint type 1015 as execution information, in the hint DB 1000.

In an embodiment, because a second hint 1021 is of the quick command type (e.g., quickcommandtype), the electronic device 700 may store "what date is it today?" 1022, "tell me the weather" 1032, and "tell me about the stock market" 1042, which are utterance commands included in the quick command of "good morning" 1021 that is the utterance provided as a second hint, as sub-utterances 1002, and may store capsule ID information 1023, 1033, and 1043 of utterance commands of the sub-utterances, goal ID information 1024, 1034, and 1044 of utterance commands of the sub-utterances, and the types of hints 1025, 1035, and 1045 of utterance commands of the sub-utterances, as execution information in the DB 1000.

In an embodiment, the electronic device 700 may store the hints 1011 and 1021 and the execution information, which are included in the hint view, in the hint DB 1000, in response to receiving a request (e.g., an attachment request) such that the hint view (e.g., the hint view 801 of FIG. 8) is displayed (e.g., maintained in display) on the screen visible to a user. In an embodiment, the electronic device 700 may delete the hints 1011 and 1021 and the execution information, which are included in the hint view, from the hint DB 1000 in response to receiving a request (e.g., a detachment request) such that the hint view is removed from the screen visible to the user.

In an embodiment, the hint registration module 710 may store all hints included in the hint view in the hint DB 1000 in response to the event that the hint view is focused. The hint registration module 710 may delete the hint and the hint execution information, which are included in the hint view, from the hint DB 1000 in response to the event that the hint view is not focused.

In an embodiment, the electronic device 700 may store all hints included in the hint view in the hint DB 1000 in response to the event that a hint view is displayed on a display included in the electronic device 700 or operatively connected to the electronic device 700. For example, the electronic device 700 may receive a request (e.g., attachment) such that the hint view is displayed on the screen viewed to the user, and then may store all hints included in the hint view in the hint DB 1000 through a user input (e.g., a scrolling input) in response to the event that the hint view is displayed on the user's display.

In an embodiment, the electronic device 700 may delete all hints included in the hint view from the hint DB 1000 in response to the event that the hint view is not displayed on the display.

Figure 11:
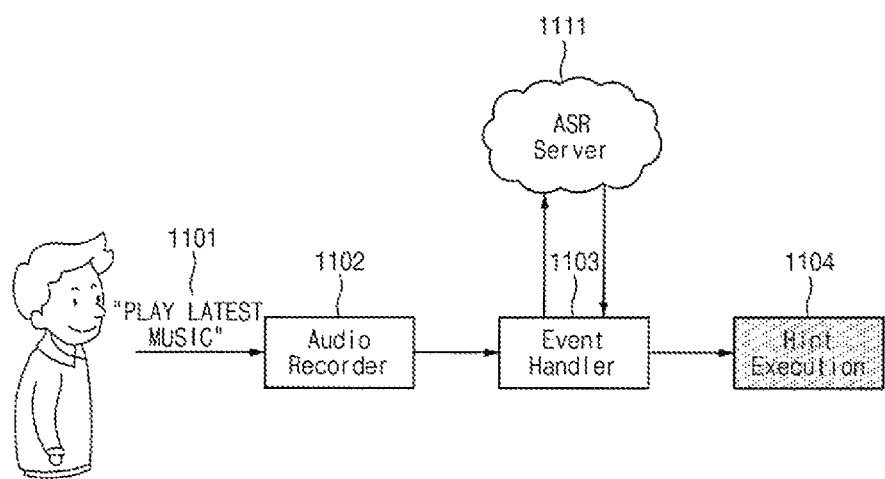
FIG. 11 is a conceptual diagram illustrating a data flow of an electronic device with respect to a user's utterance, according to certain embodiments of the disclosure.

FIG. 11 is a conceptual diagram illustrating a data flow of an electronic device with respect to a user's utterance, according to certain embodiments of the disclosure.

In an embodiment, when a user utterance 1101 (e.g., "play the latest music.") starts to be input after a voice assistant receives a wakeup word, an electronic device (e.g., the user terminal 301 of FIG. 3, the electronic device 600 of FIG. 6, or the electronic device 700 of FIG. 7) may deliver voice data to an ASR server 1111 in real time. FIG. 11 illustrates that an ASR module is present separately in the ASR server 1111. However, this is an example. For example, the ASR module may be included in the electronic device 700.

In an embodiment, the electronic device 700 may convert the received user utterance 1101 into voice data by using an audio recorder module 1102. The electronic device may deliver the converted voice data to the ASR server 1111 by using an event handler module 1103 in real time. The ASR server 1111 may convert the voice data, which is delivered in real time, into ASR text data and may deliver the ASR text data back to the event handler module 1103.

In an embodiment, the event handler module 1103 may allow a UI module (not shown) (e.g., the UI module 750 in FIG. 7) to display the converted ASR text data on a screen.

In an embodiment, the event handler module 1103 may deliver the text displayed on the screen to a hint execution module 1104 (e.g., the hint execution module 720 of FIG. 7) through the UI module (not shown).

In an embodiment, when an utterance for a text is input, the hint execution module 1104 may execute an operation corresponding to the text. This will be described in detail with reference to FIGS. 12 and 13.

Figure 12:
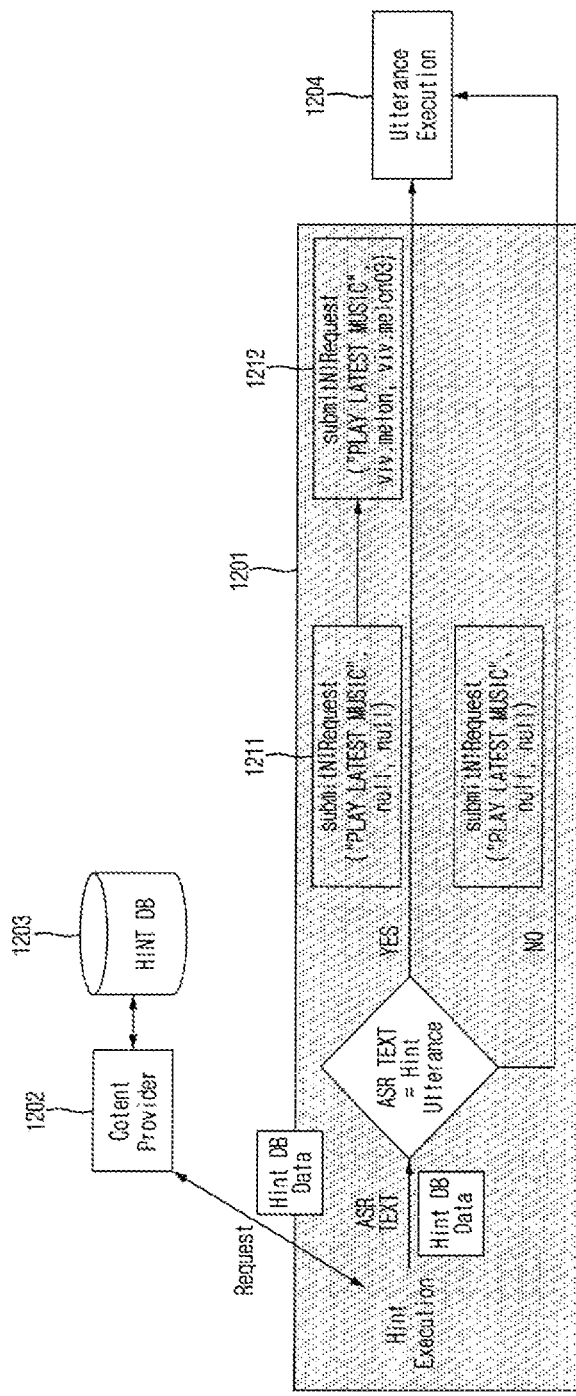
FIG. 12 is a conceptual diagram in which an electronic device processes data, according to certain embodiments of the disclosure.

FIG. 12 is a conceptual diagram in which an electronic device processes data, according to certain embodiments of the disclosure. In detail, in FIG. 12 illustrates a method in which a hint execution module 1201 (e.g., the hint execution module 720 of FIG. 7) processes data.

In an embodiment, the hint execution module 1201 may receive a final ASR text from an event handler module (not shown). The hint execution module 1201 may generate a request for hint data registered in a hint DB 1203 to a content provider module 1202 for comparison with the final ASR text. The hint data may include data including a hint and execution information.

In an embodiment, the hint execution module 1201 may determine whether hint data received from the content provider module 1202 matches the final ASR text (e.g., so as to fulfill a minimum similarity threshold), by comparing the hint data received from the content provider module 1202 with the final ASR text.

In an embodiment, when the data fails to indicate a sufficient match, the hint execution module 1201 may determine that the final ASR text corresponds to a general utterance, deliver the final ASR text to an utterance executor module 1204, and process subsequent operations.

In an embodiment, when the data indicates a minimally sufficient match or more, the hint execution module 1201 may transmit, to the utterance executor module 1204, data 1212 obtained by adding and/or changing data, such that the corresponding utterance is capable of execution with a specified domain (Capsule) and specified goal ID (Goal ID), by utilizing the matched hint data to the final ASR text 1211 (e.g., "play the latest music").

In an embodiment, the utterance executor module 1204 may deliver the received data to an NLU module (not shown). In an embodiment, the utterance executor module 1204 may deliver the received data to the NLU module (not shown) by using an event handler module (not shown).

In an embodiment, when there is a capsule ID (Capsule ID) and/or goal ID (Goal ID) in the execution information included in the received data, the NLU module (not shown) may request the corresponding capsule (Capsule) to perform an operation corresponding to the utterance command included in the data.

In an embodiment, when there is no capsule ID (Capsule ID) and/or goal ID (Goal ID) in the execution information included in the received data, the NLU module (not shown) may select a capsule (Capsule), which is capable of performing an utterance command, by analyzing the utterance command included in the data and may request the selected capsule (Capsule) to perform an operation corresponding to the utterance command. When the operation corresponding to the utterance command included in the data is performed based on the goal ID (goal ID) defined in each capsule (Capsule), the result according to the execution may be delivered back to the event handler module (not shown).

In an embodiment, the event handler module (not shown) may provide (e.g., display) the result of a user utterance processing and then may set the capsule, which executes the operation, as the desired capsule. For example, the event handler module (not shown) may provide (e.g., display) response data for inducing a user to set the capsule, which executes the operation, as the desired capsule processing the user utterance by using a UI module (not shown).

In an embodiment, when the hint has a hint of quick command type, the event handler module (not shown) may provide (e.g., display) response data for inducing a user to add the hint of the quick command type to a quick command by using the UI module (not shown).

In an embodiment, the UI module (not shown) may provide (e.g., display) the response data by using an interface included in the electronic device 700 or operatively connected to the electronic device 700.

Hereinafter, according to certain embodiments of the disclosure, a method performed by an electronic device will be described with reference to FIG. 13.

Figure 13:
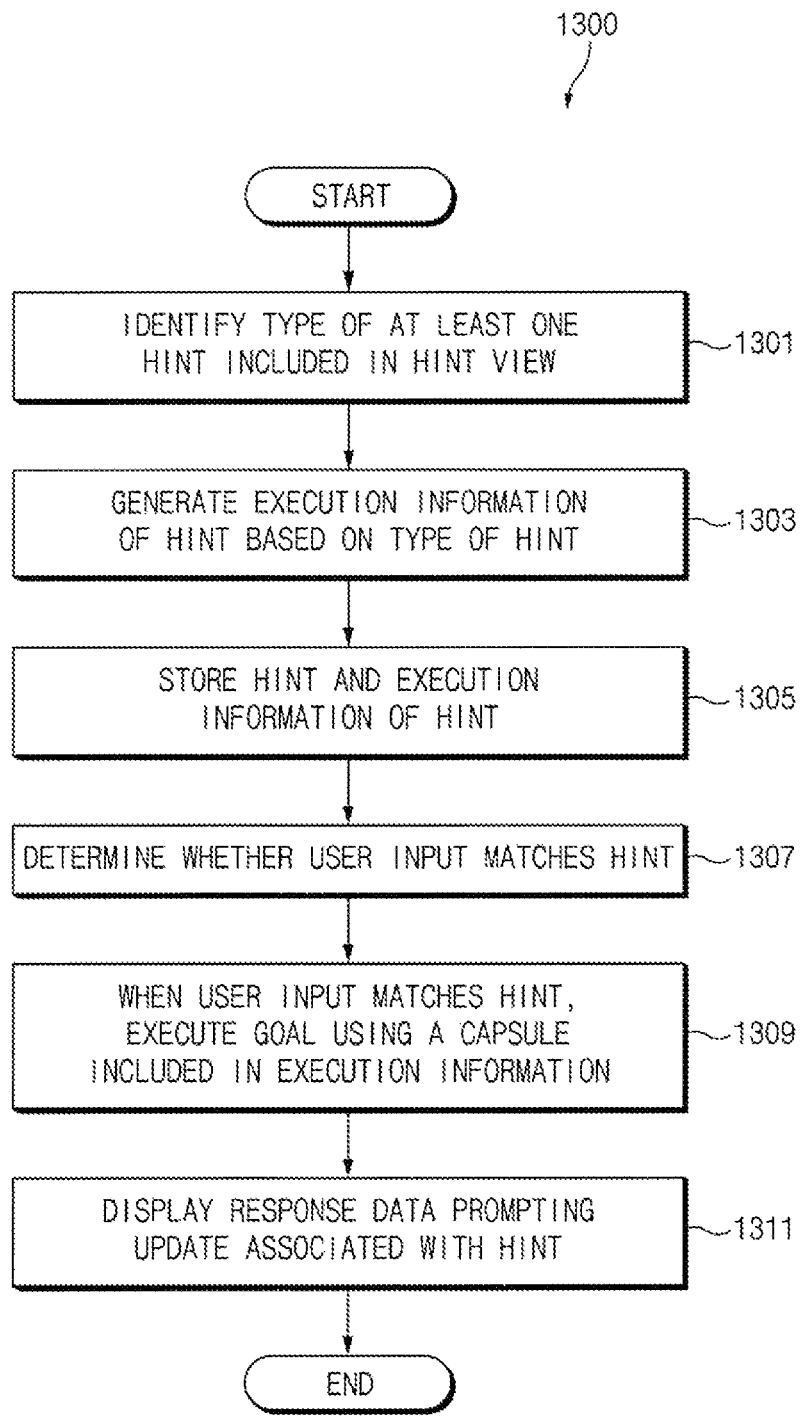
FIG. 13 is a flowchart of a method performed by an electronic device, according to certain embodiments of the disclosure.

FIG. 13 is a flowchart 1300 of a method performed by an electronic device, according to certain embodiments of the disclosure. According to an embodiment, it may be understood that the process illustrated in FIG. 13 is performed by a processor (e.g., the processor 120 of FIG. 1) of an electronic device (e.g., the electronic device 101 of FIG. 1) by executing instructions stored in a memory (e.g., the memory 130 of FIG. 1).

In operation 1301, the electronic device 101 may identify the type of at least one hint included in a hint view. The electronic device 101 may determine whether the type of the hint is an utterance command type (utterancetype) or a quick command type (quickcommandtype). The utterance command type (utterancetype) may mean the type of a hint including one utterance command. The quick command type (quickcommandtype) may mean the type of a hint including a plurality of utterance commands.

In operation 1303, the electronic device 101 may generate execution information of the identified hint based on the type of the hint.

In an embodiment, when the hint is of an utterance command type (utterancetype), the electronic device 101 may generate the execution information including capsule ID information and goal ID information.

In an embodiment, when the hint is of a quick command type (quickcommandtype), the electronic device 101 may generate the execution information including keyword command information and utterance command set information including a quick command. The keyword command information may mean information about a command for executing the quick command. The utterance command set may mean a set implemented using at least one utterance command. The at least one utterance command may include capsule ID information and goal ID information.

At least one utterance command included in the utterance command set may include a capsule ID and a goal ID.

In operation 1305, the electronic device 101 may store the hint and execution information of the hint. The electronic device 101 may store and/or delete the hint in a DB (e.g., the hint DB 741 of FIG. 7) included in the electronic device 101 or operatively connected to the electronic device 101.

In an embodiment, the electronic device 101 may store at least one hint included in the hint view in a DB (e.g., the hint DB 741 in FIG. 7) included in the electronic device 101 or operatively connected to the electronic device 101 in response to receiving a request (attach) such that the hint view is displayed on a screen viewed to a user.

In an embodiment, the electronic device 101 may delete all hints included in the hint view from the DB (e.g., the hint DB 741 in FIG. 7) included in the electronic device 101 or operatively connected to the electronic device 101 in response to receiving a request (detach) such that the hint view disappears from the screen viewed to the user.

In an embodiment, the electronic device 101 may store at least one hint included in the hint view in the DB (e.g., the hint DB 741 in FIG. 7) included in the electronic device 101 or operatively connected to the electronic device 101 in response to the event that the hint view is focused.

In an embodiment, the electronic device 101 may delete at least one hint included in the hint view from the DB (e.g., the hint DB 741 in FIG. 7) included in the electronic device 101 or operatively connected to the electronic device 101 in response to the event that the hint view is not focused.

In an embodiment, the electronic device 101 may store all hints included in the hint view in the DB (e.g., the hint DB 741 in FIG. 7) included in the electronic device 101 or operatively connected to the electronic device 101 in response to the event that a hint view is displayed on a display included in the electronic device 101 or operatively connected to the electronic device 700. For example, the electronic device 101 may receive a request (attach) such that the hint view is displayed on the screen viewed to the user, and then may store all hints included in the hint view in the DB (e.g., the hint DB 741 in FIG. 7) included in the electronic device 101 or operatively connected to the electronic device 101 through a user input (e.g., a scrolling input) in response to the event that the hint view is displayed on the user's display.

In an embodiment, the electronic device 101 may delete all hints included in the hint view from the DB (e.g., the hint DB 741 in FIG. 7) included in the electronic device 101 or operatively connected to the electronic device 101 in response to the event that the hint view is not displayed on the display.

In operation 1307, after receiving a user input, the electronic device 101 may determine whether the user input matches the hint. In an embodiment, the electronic device 101 may receive, from an ASR module (e.g., the ASR module 760), ASR text data obtained by converting the user's voice input into a text. The electronic device 101 may determine whether the user input matches the hint, by determining whether the ASR text data includes an utterance similar to the utterance command stored in the DB (e.g., the hint DB 741 in FIG. 7) included in the electronic device 101 or operatively connected to the electronic device 101.

When the user input matches the hint, then in operation 1309, the electronic device 101 may execute a goal included in the execution information, using a capsule included in the execution information. In an embodiment, when there is matched data, the electronic device 101 may add and/or change data such that the corresponding utterance is capable of being executed with a specified domain (Capsule) and a specified goal ID (goal ID) by utilizing utterance command data stored in the DB (e.g., the hint DB 741 in FIG. 7) that is included in the electronic device 101 that matches the ASR text data or is operatively connected to the electronic device 101.

In operation 1311, the electronic device 101 may display response data prompting an update associated with the hint. The electronic device 101 may display response data for inducing an update of the operation for the hint based on the execution information. The response data may prompt an update on the processing of the user utterance corresponding to the hint. The response data may include an icon, which is capable of setting a default capsule executing an operation corresponding to a second user input as a capsule included in the execution information, when the second user input identical or similar to the utterance command included in the hint is received.

In an embodiment, a method performed by an electronic device may include identifying a type of at least one hint included in a hint view displayed by using a user interface included in the electronic device or operatively connected to the electronic device, when a process for a memory included in the electronic device or operatively connected to the electronic device is executed, generating execution information of the hint based on the type of the hint, storing the hint and the execution information of the hint, determining whether a user input received by using the user interface matches the hint, executing a goal included in the execution information by using a capsule included in the execution information when the user input matches the hint, and displaying response data for inducing an update of an operation for the hint based on the execution information, by using the user interface.

In an embodiment, the method performed by the electronic device may further include receiving a voice signal included in the user input by using a sound model included in the electronic device or operatively connected to the electronic device and causing the sound model to be trained by using a learning algorithm.

In an embodiment, the method performed by the electronic device may further include identifying the type of the hint based on whether the at least one hint included in the hint view includes one utterance command.

In an embodiment, the method performed by the electronic device may further include identifying the hint as a hint of an utterance command type when the at least one hint included in the hint view includes one utterance command, and generating the execution information including at least one of a capsule ID and a goal ID of the utterance command in the execution information when the hint is the hint of the utterance command type.

In an embodiment, the method performed by the electronic device may further include identifying the hint as a hint of a quick command type when the at least one hint included in the hint view includes a plurality of utterance commands, and generating the execution information including at least one of a capsule ID and a goal ID for a keyword command for executing the quick command and each of the plurality of utterance commands in the execution information when the hint is the hint of the quick command type.

In an embodiment, the method performed by the electronic device may further include storing the at least one hint included in the hint view in response to receiving a request (attach) such that the hint view is displayed on a screen viewed to a user, and deleting the at least one hint included in the hint view in response to receiving a request (detach) such that the hint view disappears from a screen viewed to a user.

In an embodiment, the method performed by the electronic device may further include storing the at least one hint included in the hint view in response to an event that the hint view is focused, and deleting the at least one hint included in the hint view in response to an event that the hint view is not focused.

In an embodiment, the method performed by the electronic device may further include converting the user input into ASR text data by using an ASR module included in the electronic device or operatively connected to the electronic device, and determining whether the user input matches the hint, based on the converted ASR text data.

In an embodiment, the method performed by the electronic device may further include changing information about at least one of a capsule ID and a goal ID of the hint by using the execution information when the user input is matched with the hint.

In an embodiment, in the method performed by the electronic device, the response data may be data including an icon, which is capable of including a default capsule executing an operation corresponding to a second user input as the capsule included in the execution information, when the second user input, which is identical to the utterance command included in the hint or capable of being recognized to be identical to the utterance command included in the hint, is received.

Figure 14:
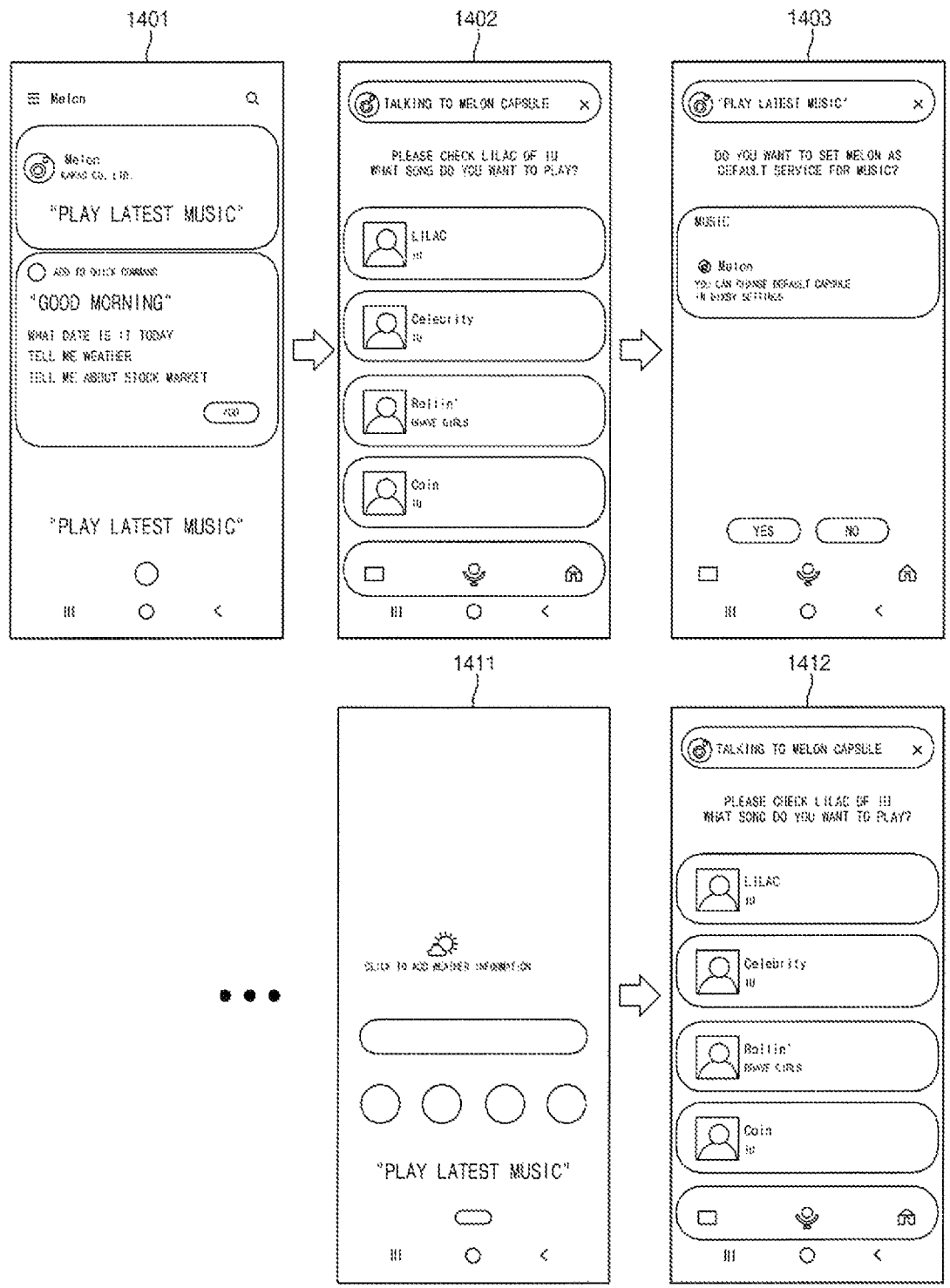
FIG. 14 is an example diagram of a method performed by an electronic device, according to certain embodiments of the disclosure.
Figure 15:
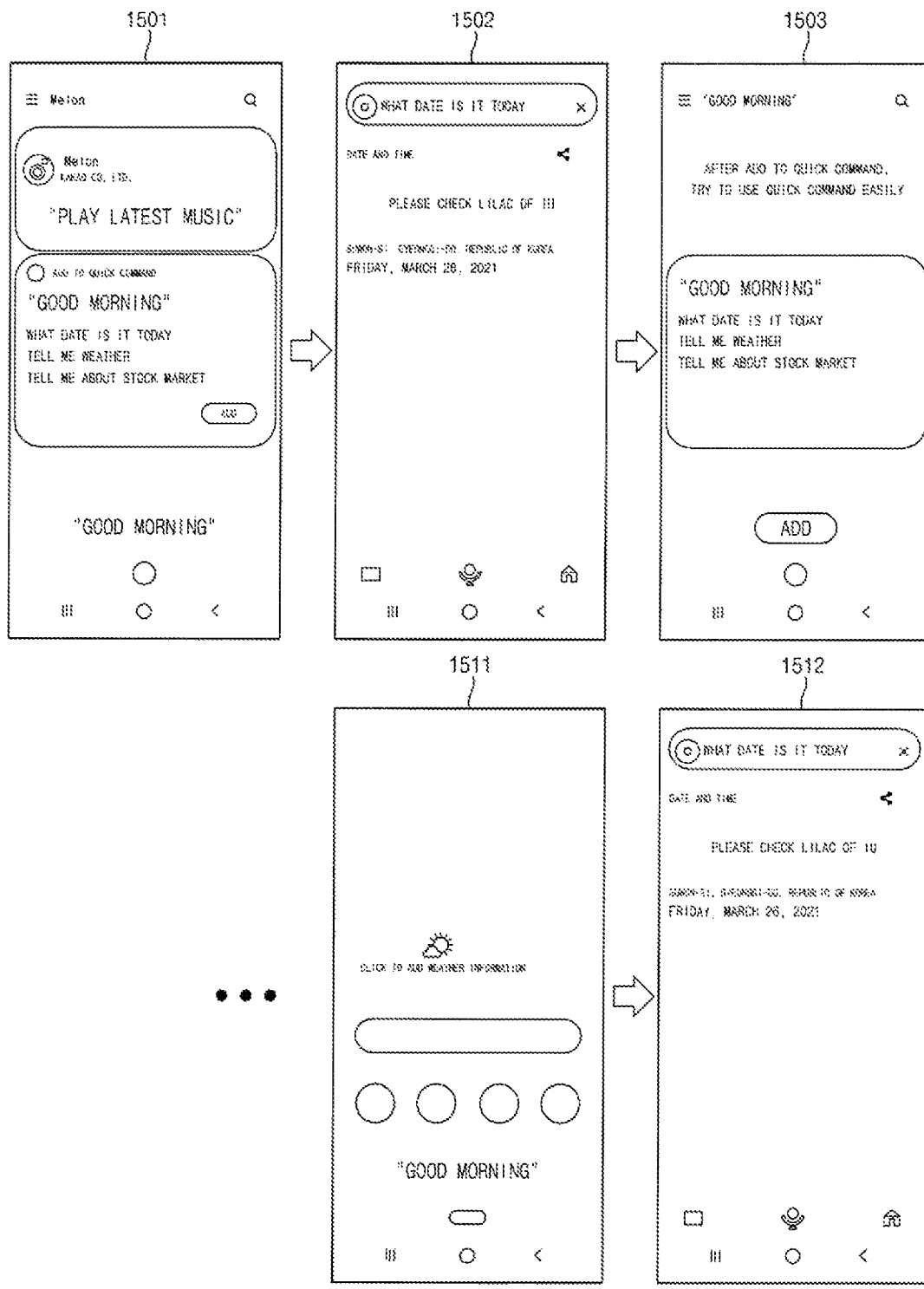
FIG. 15 is another example diagram of a method performed by an electronic device, according to certain embodiments of the disclosure.

Hereinafter, FIGS. 14 to 15 are diagrams illustrating a method performed by the electronic device 101 according to an embodiment of the disclosure. For clarity of description, descriptions the same as the above-mentioned descriptions may be briefly described or omitted.

Referring to a screen 1401 shown in FIG. 14, the electronic device 101 may receive a user utterance corresponding to a hint of "play the latest music" displayed in a hint view and may provide (e.g., display) an execution screen of a capsule, which will execute an operation corresponding to the user utterance.

Referring to a screen 1402, the electronic device 101 may provide (e.g., display) a result indicating that the user utterance is completely processed. Referring to a screen 1403, the electronic device 101 may provide (e.g., display) response data for inducing a user to set the capsule (e.g., Melon capsule) executing the operation as the desired capsule that processes the user utterance.

The electronic device 101 may set the capsule executing the operation as the desired capsule based on a user input using the response data.

Referring to screens 1411 and 1412, afterward, when the user utterance corresponding to a hint of "play the latest music" is received, the electronic device 101 may process the user utterance by executing the desired capsule without a user input.

FIG. 15 is another example diagram of a method performed by an electronic device, according to certain embodiments of the disclosure. Referring to a screen 1501 shown in FIG. 15, an electronic device 101 may receive a user utterance corresponding to a hint of a quick command type of "good morning" displayed in a hint view and then may sequentially execute utterance commands included in the hint of the quick command type.

Referring to a screen 1502, the electronic device 101 may provide (e.g., display) the result indicating that the user utterance corresponding to the hint of the quick command type is completely processed. Referring to a screen 1503, the electronic device 101 may provide (e.g., display) response data for inducing a user to add the hint of the quick command type to a quick command.

The electronic device 101 may add the hint of the quick command type to a quick command based on a user input using the response data.

Referring to screens 1511 and 1512, afterward, when a user utterance corresponding to a hint of "good morning" is received, the electronic device 101 may process the user utterance by sequentially executing utterance commands included in the hint of the quick command type without a separate user input.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
a display;
input circuitry;
a memory; and
a processor operatively connected to the display, the input circuitry and the memory,
wherein the memory stores instructions executable by the processor to cause the electronic device to:
display on the display a hint view, including at least one hint corresponding to a user utterance,
identify a type of the at least one hint displayed in the hint view,
generate execution information for the at least one hint, based on the identified type, wherein the execution information includes at least a goal indicative of a function to be executed, and a capsule indicative of a domain in which the goal is executed;
store the at least one hint with the generated execution information in the memory;
receive a user input through the input circuitry, and determine whether the received user input corresponds to the stored at least one hint;
when the received user input corresponds the at least one hint, execute the goal using the capsule included in the execution information; and
display response data prompting an update on the processing of the user utterance corresponding to the at least one hint.

2. The electronic device of claim 1,
wherein the instructions are further executable by the processor to cause the electronic device:
receive the user input including a voice signal.

3. The electronic device of claim 1, wherein
identifying the type of the at least one hint is further based on whether the at least one hint includes a single utterance command.

4. The electronic device of claim 3, wherein the instructions are further executable by the processor to cause the electronic device:
when the at least one hint includes a single utterance command, identify that the hint is of an utterance command type,
wherein when the at least one hint is of the utterance command type, the goal and the capsule of the utterance command are generated in the execution information.

5. The electronic device of claim 3, wherein the instructions are further executable by the processor to cause the electronic device:
when the at least one hint includes a plurality of utterance commands, identify the at least one hint is of a quick command type,
wherein when the at least one hint is of the quick command type, the execution information includes a plurality of goals and a plurality of identified capsules respectively corresponding to the plurality of utterance commands.

6. The electronic device of claim 1, wherein the instructions are further executable by the processor to cause the electronic device:
in response to receiving an attachment request to display the hint view on the display, store the at least one hint in the memory; and
in response to receiving a detachment request to remove the hint view from the display, delete the at least one hint from the memory.

7. The electronic device of claim 1, wherein the instructions are further executable by the processor to cause the electronic device:
store the at least one hint included in the hint view in response to an event in which the hint view is focused to be set to the highest priority with respect to a user input among the displayed elements; and
delete the at least one hint included in the hint view in response to another event in which the hint view is unfocused.

8. The electronic device of claim 1, wherein the instructions are further executable by the processor to cause the electronic device:
determine whether the user input matches the at least one hint, based on text data converted based on the user input.

9. The electronic device of claim 1, wherein the instructions are further executable by the processor to cause the electronic device:
when the user input corresponds with the at least one hint, change at least one of the capsule and the goal of the at least one hint, using the execution information.

10. The electronic device of claim 1, wherein the response data includes an icon, which is capable of setting a default capsule executing an operation corresponding to a second user input as the capsule included in the execution information, when the second user input, which is identical to the utterance command included in the hint or capable of being recognized to be identical to the utterance command included in the hint, is received.

11. A method of an electronic device, the method comprising:
displaying, on a display included in the electronic device or operatively connected to the electronic device, a hint view, including at least one hint corresponding to a user utterance;
identifying, via at least one processor, a type of the at least one hint included in the hint view;
generating execution information for the at least one hint based on the identified type, wherein the execution information includes at least a goal indicative of a function to be executed, and a capsule indicative of a domain in which the goal is executed;
storing the at least one hint with the execution information of the hint in a memory;
receiving a user input through input circuitry and determining whether the receiver user input corresponds to the stored at least one hint;
when the received user input corresponds to the at least one hint, executing the goal included using the AI capsule included in the execution information; and
displaying response data prompting an update on the processing of the user utterance corresponding to the at least one hint.

12. The method of claim 11, wherein the user input includes a voice signal.

13. The method of claim 11, wherein
identifying the type of the at least one hint is further based on whether the at least one hint includes a single utterance command.

14. The method of claim 13, further comprising:
when the at least one hint includes a single utterance command, identifying that the hint is of an utterance command type,
wherein when the at least one hint is of the utterance command type, the goal and the capsule of the utterance command are generated in the execution information.

15. The method of claim 13, further comprising:
when the at least one hint includes a plurality of utterance commands, identifying the at least one hint is of a quick command type,
wherein when the at least one hint is of the quick command type, the execution information includes a plurality of goals and a plurality of identified capsules respectively corresponding to the plurality of utterance commands.

16. The method of claim 11, further comprising:
in response to receiving an attachment request to display the hint view on the display, storing the at least one hint in the memory; and
in response to receiving a detachment request to remove the hint view from the display, deleting the at least one hint from the memory.

17. The method of claim 11, further comprising:
storing the at least one hint included in the hint view in response to an event in which the hint view is focused to be set to the highest priority with respect to a user input among the displayed elements; and
deleting the at least one hint included in the hint view in response to another event in which the hint view is unfocused.

18. The method of claim 11, further comprising:
determining whether the user input matches the at least one hint, based on text data converted based on the user input.

19. The method of claim 11, further comprising:
when the user input corresponds with the at least one hint, changing at least one of the capsule and the goal of the at least one hint, using the execution information.

20. The method of claim 11, wherein the response data is data including an icon, which is capable of setting a default capsule executing an operation corresponding to a second user input as the capsule included in the execution information, when the second user input, which is identical to the utterance command included in the hint or capable of being recognized to be identical to the utterance command included in the hint, is received.

* * * * *